US010237551B2

United States Patent
Minezawa et al.

(10) Patent No.: US 10,237,551 B2
(45) Date of Patent: Mar. 19, 2019

(54) MOVING IMAGE ENCODING DEVICE, MOVING IMAGE DECODING DEVICE, MOVING IMAGE CODING METHOD, AND MOVING IMAGE DECODING METHOD

(71) Applicant: Mitsubishi Electric Corporation, Tokyo (JP)

(72) Inventors: Akira Minezawa, Tokyo (JP); Shunichi Sekiguchi, Tokyo (JP); Kazuo Sugimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/634,485

(22) Filed: Feb. 27, 2015

(65) Prior Publication Data

US 2015/0245023 A1 Aug. 27, 2015

Related U.S. Application Data

(62) Division of application No. 13/822,887, filed as application No. PCT/JP2011/004122 on Jul. 21, 2011.

(30) Foreign Application Priority Data

Sep. 30, 2010 (JP) .................................. 2010-221471

(51) Int. Cl.
*H04N 19/105* (2014.01)
*H04N 19/117* (2014.01)
(Continued)

(52) U.S. Cl.
CPC ......... *H04N 19/105* (2014.11); *H04N 19/117* (2014.11); *H04N 19/136* (2014.11);
(Continued)

(58) Field of Classification Search
CPC .. H04N 7/50; H04N 7/26244; H04N 7/26888; H04N 7/462; H04N 7/26335; H04N 7/26941
See application file for complete search history.

(56) References Cited

U.S. PATENT DOCUMENTS

| 2004/0136458 A1 | 7/2004 | Dahlhoff et al. |
| 2005/0062746 A1 * | 3/2005 | Kataoka ................. H04N 19/61 345/505 |

(Continued)

FOREIGN PATENT DOCUMENTS

| EP | 2 400 763 A2 | 12/2011 |
| EP | 2 600 613 A2 | 6/2013 |

(Continued)

OTHER PUBLICATIONS

"Advanced video coding for generic audiovisual services," Series H: Audiovisual and Multimedia Systems, Infrastructure of audiovisual services-Coding of moving video, ITU-T H.264, Jan. 2012.

(Continued)

*Primary Examiner* — Shawn S An
(74) *Attorney, Agent, or Firm* — Birch, Stewart, Kolasch & Birch, LLP

(57) ABSTRACT

When carrying out an intra-frame prediction process to generate an intra prediction image by using an already-encoded image signal in a frame, an intra prediction part 4 selects a filter from one or more filters which are prepared in advance according to the states of various parameters associated with the encoding of a target block to be filtered, and carries out a filtering process on a prediction image by using the filter. As a result, prediction errors which occur locally can be reduced, and the image quality can be improved.

10 Claims, 9 Drawing Sheets

(51) Int. Cl.
*H04N 19/159* (2014.01)
*H04N 19/176* (2014.01)
*H04N 19/82* (2014.01)
*H04N 19/147* (2014.01)
*H04N 19/593* (2014.01)
*H04N 19/136* (2014.01)
*H04N 19/157* (2014.01)
*H04N 19/182* (2014.01)
*H04N 19/61* (2014.01)

(52) U.S. Cl.
CPC ......... *H04N 19/147* (2014.11); *H04N 19/157* (2014.11); *H04N 19/159* (2014.11); *H04N 19/176* (2014.11); *H04N 19/182* (2014.11); *H04N 19/593* (2014.11); *H04N 19/82* (2014.11); *H04N 19/61* (2014.11)

(56) References Cited

U.S. PATENT DOCUMENTS

| | | | |
|---|---|---|---|
| 2006/0204221 A1 | 9/2006 | Uchida et al. | |
| 2007/0121731 A1* | 5/2007 | Tanizawa | H04N 19/176 375/240.24 |
| 2009/0003441 A1* | 1/2009 | Sekiguchi | H04N 19/176 375/240.13 |
| 2009/0225842 A1 | 9/2009 | Cheon et al. | |
| 2009/0238276 A1 | 9/2009 | Har-Noy | |
| 2009/0252221 A1 | 10/2009 | Park et al. | |
| 2010/0061645 A1 | 3/2010 | Wilkins et al. | |
| 2010/0086034 A1* | 4/2010 | Park | H04N 19/176 375/240.12 |
| 2011/0090969 A1 | 4/2011 | Sung et al. | |
| 2011/0103475 A1* | 5/2011 | Alshina | H04N 19/13 375/240.12 |
| 2011/0200103 A1 | 8/2011 | Kim et al. | |
| 2011/0255602 A1 | 10/2011 | Kondo et al. | |
| 2012/0140821 A1* | 6/2012 | Drugeon | H04N 19/105 375/240.12 |
| 2012/0200669 A1* | 8/2012 | Lai | G06T 5/002 348/43 |
| 2012/0294358 A1* | 11/2012 | Suzuki | H04N 19/105 375/240.12 |
| 2013/0039421 A1 | 2/2013 | Lee et al. | |
| 2015/0181211 A1 | 6/2015 | He | |
| 2016/0021383 A1* | 1/2016 | Wittmann | H04N 19/50 382/238 |

FOREIGN PATENT DOCUMENTS

| | | |
|---|---|---|
| JP | 2005-512419 A | 4/2005 |
| JP | 2006-032999 A | 2/2006 |
| JP | 2006-229411 A | 8/2006 |
| JP | 2010-507335 A | 3/2010 |
| JP | 2010-104028 A | 5/2010 |
| JP | 2010-183162 A | 8/2010 |
| KR | 10-2005-0108235 A | 11/2005 |
| TW | 200818922 A | 4/2008 |
| WO | WO 2007/055445 A1 | 5/2007 |
| WO | WO 2009/120040 A2 | 10/2009 |
| WO | WO 2009/136743 A2 | 11/2009 |
| WO | WO 2010/030744 A2 | 3/2010 |
| WO | WO 2010/047499 A3 | 4/2010 |
| WO | WO 2010/064675 A1 | 6/2010 |
| WO | WO 2010/095915 A2 | 8/2010 |
| WO | WO 2011/049396 A2 | 4/2011 |
| WO | WO 2011/126349 A2 | 10/2011 |

OTHER PUBLICATIONS

Korean Office Action issued for KR-10-2014-7020850 dated Oct. 31, 2014.
Notice of Reasons for Rejection issued in JP-2012-536150, dated Nov. 12, 2013.
Russian Office Action issued in corresponding PCT Application for Application No. 2013119934, dated Aug. 29, 2014.
Extended European Search Report dated Feb. 12, 2016 in corresponding European Application No. 11828289.6.
McCann K. et al. "Video Coding Technology Proposal by Samsung (and BBC)", Joint Collaborative Team on Video Coding (JCT-VC) of ITU-T SG16 WP3 and ISO/IEC JTC1/SC29/WG11, 1st Mtg. Dresden, DE, Apr. 15-23, 2010.
Taiwanese Office Action dated Feb. 22, 2017 in corresponding Taiwanese Patent Application No. 105123725 with an English Translation.
Office Action dated Sep. 26, 2017 in corresponding Japanese Application No. 2016-173530 with an English Translation.
Taiwanese Office Action dated Apr. 13, 2017 issued in corresponding Taiwanese Patent Application No. 105123731 with an English Translation.
Office Action dated Jan. 9, 2018 in corresponding Japanese Patent Application No. 2016-173530 with an English Translation.
Office Action issued in the corresponding Indian Patent Application No. 2415/CHENP/2013 dated Apr. 17, 2018.
Communication Pursuant to Article 94(3) EPC dated Apr. 6, 2018 in corresponding European Patent Application No. 11 828 289.6.
Canadian Office Action issued in the corresponding Canadian Application No. 3,000,366 dated May 1, 2018.
Communication Pursuant to Article 94(3) EPC dated Apr. 6, 2016 in corresponding European Patent Application No. 11 828 289.6.
Canadian Office Action issued in the corresponding Canadian Application No. 3,000,366 dated Sep. 14, 2018.

* cited by examiner

FIG.7
| Intra Prediction Mode Index | Intra Prediction Mode |
|---|---|
| 0 | Vertical Prediction |
| 1 | Horizontal Prediction |
| 2 | Average Prediction |
| 3~N-1 | Diagonal Prediction |
N: Number Of Intra Prediction Modes
Directional Predictions in Case of N=9 (8 Modes)
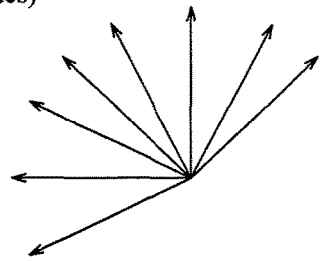
Directional Predictions in Case of N=17 (16 Modes)
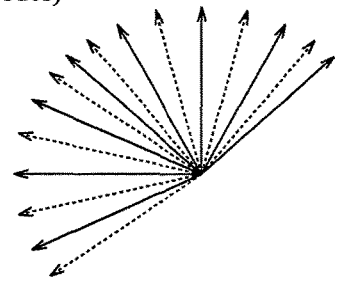
Directional Prediction in Case of N=33 (32 Modes)
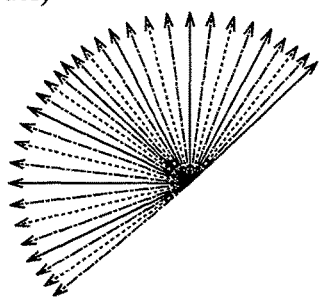

MOVING IMAGE ENCODING DEVICE, MOVING IMAGE DECODING DEVICE, MOVING IMAGE CODING METHOD, AND MOVING IMAGE DECODING METHOD

This application is a Divisional of copending application Ser. No. 13/822,887, filed on Mar. 13, 2013, which is a 371 National Phase Application of PCT/JP2011/004122 which claims priority under 35 U.S.C. § 119(a) to Application No. JP2010-221471, filed in Japan on Sep. 30, 2010, all of which are hereby expressly incorporated by reference into the present application.

FIELD OF THE INVENTION

The present invention relates to a moving image encoding device for and a moving image encoding method of encoding a moving image with a high degree of efficiency, and a moving image decoding device for and a moving image decoding method of decoding an encoded moving image with a high degree of efficiency.

BACKGROUND OF THE INVENTION

For example, in accordance with an international standard video encoding method, such as MPEG (Moving Picture Experts Group) or "ITU-T H.26x", an inputted video frame is divided into rectangular blocks (encoding target blocks), a prediction process using an already-encoded image signal is carried out on each encoding target block to generate a prediction image, and orthogonal transformation and a quantization process is carried out on a prediction error signal which is the difference between the encoding target block and the prediction image in units of a block, so that information compression is carried out on the inputted video frame.

For example, in the case of AVC/H.264 (ISO/IEC 14496-101 ITU-T H.264) which is an international standard method, an intra prediction process from already-encoded adjacent pixels or a motion-compensated prediction process between adjacent frames is carried out (for example, refer to nonpatent reference 1). In the case of MPEG-4 AVC/H.264, one prediction mode can be selected from a plurality of prediction modes for each block in an intra prediction mode of luminance. FIG. 10 is an explanatory drawing showing intra prediction modes in the case of a 4×4 pixel block size for luminance. In FIG. 10, each white circle shows a pixel in a coding block, and each black circle shows a pixel that is used for prediction, and that exists in an already-encoded adjacent block.

In the example shown in FIG. 10, nine modes 0 to 8 are prepared as intra prediction modes, and the mode 2 is the one in which an average prediction is carried out in such a way that each pixel in the target coding block is predicted by using the average of adjacent pixels existing in the upper and left blocks. The modes other than the mode 2 are intra prediction modes in each of which a directional prediction is carried out. The mode 0 is the one in which a vertical prediction is carried out in such a way that adjacent pixels in the upper block are repeatedly replicated to create plural rows of pixels along a vertical direction to generate a prediction image. For example, the mode 0 is selected when the target coding block is a vertically striped pattern. The mode 1 is the one in which a horizontal prediction is carried out in such a way that adjacent pixels in the left block are repeatedly replicated to create plural columns of pixels along a horizontal direction to generate a prediction image.

For example, the mode 1 is selected when the target coding block is a horizontally striped pattern. In each of the modes 3 to 8, interpolation pixels running in a predetermined direction (i.e., a direction shown by arrows) are generated by using the adjacent pixels in the upper block or the left block to generate a prediction image.

In this case, the block size for luminance to which an intra prediction is applied can be selected from 4×4 pixels, 8×8 pixels, and 16×16 pixels. In the case of 8×8 pixels, nine intra prediction modes are defined, like in the case of 4×4 pixels. In contrast with this, in the case of 16×16 pixels, four intra prediction modes which are called plane predictions are defined in addition to intra prediction modes associated with an average prediction, a vertical prediction, and a horizontal prediction. Each intra prediction associated with a plane prediction is a mode in which pixels created by carrying out an interpolation in a diagonal direction on the adjacent pixels in the upper block and the adjacent pixels in the left block are provided as predicted values.

In a directional prediction mode in the case of a block size of 4×4 pixels or 8×8 pixels, because predicted values are generated along a direction predetermined according to the mode, e.g., a direction of 45 degrees, the prediction efficiency increases and the code amount can be reduced when the direction of a boundary (edge) of an object in a block matches the direction shown by the prediction mode. However, a slight displacement may occur between the direction of an edge and the direction shown by the prediction mode, and, even if the direction of an edge in the encoding target block does not match the direction shown by the prediction mode, a large prediction error may occur locally for the simple reason that the edge is slightly distorted (swung, bent, or the like). As a result, the prediction efficiency may drop extremely. In order to prevent such a reduction in the prediction efficiency, when performing an 8×8-pixel directional prediction, a smoothed prediction image is generated by setting encoded adjacent pixels which are filtered by a smoothing filter as reference images which are used at the time of generating a prediction image, thereby reducing any slight displacement in the prediction direction and prediction errors which occur when a slight distortion occurs in an edge.

RELATED ART DOCUMENT

Nonpatent Reference

Nonpatent reference 1: MPEG-4 AVC (ISO/IEC 14496-10)/ H.ITU-T 264 standards

SUMMARY OF THE INVENTION

Problems to be Solved by the Invention

Because the conventional image encoding device is constructed as above, carrying out a filtering process to generate a smoothed prediction image can reduce prediction errors occurring even if a slight displacement occurs in the prediction direction or a slight distortion occurs in an edge. However, according to the technique disclosed in nonpatent reference 1, no filtering process is carried out on blocks other than 8×8-pixel blocks, and only one possible filter used for 8×8-pixel blocks is provided. A problem is that also in a block having a size other than 8×8 pixels, a large prediction error actually occurs locally due to a slight mismatch in an edge even when the prediction image has a pattern similar to that of the image to be encoded, and therefore a large reduction occurs in the prediction efficiency. A further problem is that when a quantization parameter which is used when quantizing a prediction error signal, the position of each pixel, or the like differs between blocks having the same size, a filter suitable for reducing local prediction errors differs between the blocks, but only one possible filter is prepared, and therefore prediction errors cannot be sufficiently reduced.

The present invention is made in order to solve the above-mentioned problems, and it is therefore an object of the present invention to provide a moving image encoding device, a moving image decoding device, a moving image encoding method, and a moving image decoding method capable of reducing prediction errors which occur locally, thereby being able to improve the image quality.

Means for Solving the Problem

In accordance with the present invention, there is provided a moving image decoding device including an intra prediction unit for, when an encoding mode associated with a coding block is an intra encoding mode, carrying out an intra-frame prediction process on each block which is a unit for prediction process of the coding block, in which the intra prediction unit generates an intermediate predicted value from reference samples according to an intra prediction parameter, sets a value which is obtained by filtering the intermediate predicted value as a final predicted value only at specific positions in the block, and sets the intermediate predicted value as a final predicted value at any other positions in the block.

Advantages of the Invention

Because the moving image decoding device in accordance with the present invention is constructed in such a way that the moving image decoding device includes the intra prediction unit for, when an encoding mode associated with a coding block is an intra encoding mode, carrying out an intra-frame prediction process on each block which is a unit for prediction process of the coding block, and the intra prediction unit generates an intermediate predicted value from reference samples according to an intra prediction parameter, sets a value which is obtained by filtering the intermediate predicted value as a final predicted value only at specific positions in the block, and sets the intermediate predicted value as a final predicted value at any other positions in the block, there is provided an advantage of being able to reduce prediction errors which occur locally, thereby enabling even the moving image decoding device to generate the same intra prediction image as that generated by a moving image encoding device having a high degree of image quality.

BRIEF DESCRIPTION OF THE FIGURES

FIG. 7 is an explanatory drawing showing an example of intra prediction parameters (intra prediction mode) which can be selected for each partition $P_i^n$ in a coding block $B^n$;

EMBODIMENTS OF THE INVENTION

Figure 1:
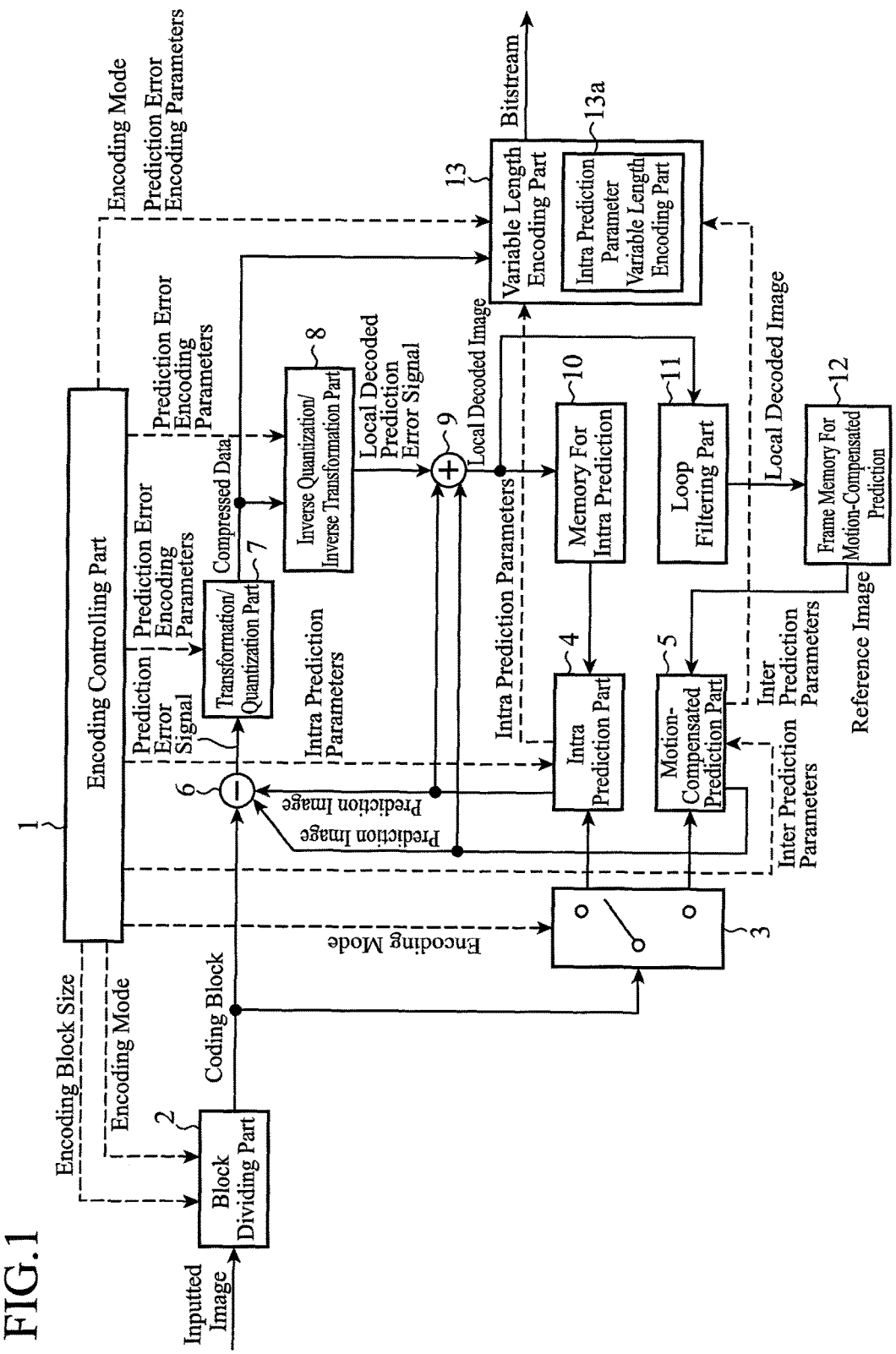
FIG. 1 is a block diagram showing a moving image encoding device in accordance with Embodiment 1 of the present invention.

Hereafter, in order to explain this invention in greater detail, the preferred embodiments of the present invention will be described with reference to the accompanying drawings.

Embodiment 1

In this Embodiment 1, a moving image encoding device that inputs each frame image of a video, carries out an intra prediction process from already-encoded adjacent pixels or a motion-compensated prediction process between adjacent frames to generate a prediction image, carries out a compression process according to orthogonal transformation and quantization on a prediction error signal which is a difference image between the prediction image and a frame image, and, after that, carries out variable length encoding to generate a bitstream, and a moving image decoding device that decodes the bitstream outputted from the moving image encoding device will be explained.

The moving image encoding device in accordance with this Embodiment 1 is characterized in that the moving image encoding device adapts itself to a local change of a video signal in space and time directions to divide the video signal into regions of various sizes, and carries out intra-frame and inter-frame adaptive encoding. In general, a video signal has a characteristic of its complexity varying locally in space and time. There can be a case in which a pattern having a uniform signal characteristic in a relatively large image area, such as a sky image or a wall image, or a pattern having a complicated texture pattern in a small image area, such as a person image or a picture including a fine texture, also coexists on a certain video frame from the viewpoint of space. Also from the viewpoint of time, a relatively large image area, such as a sky image or a wall image, has a small local change in a time direction in its pattern, while an image of a moving person or object has a larger temporal change because its outline has a movement of a rigid body and a movement of a non-rigid body with respect to time.

Although a process of generating a prediction error signal having small signal power and small entropy by using a temporal and spatial prediction, thereby reducing the whole code amount, is carried out in the encoding process, the code amount of parameters used for the prediction can be reduced as long as the parameters can be applied uniformly to as large an image signal region as possible. On the other hand, because the amount of errors occurring in the prediction increases when the same prediction parameters are applied to an image signal pattern having a large change in time and space, the code amount of the prediction error signal cannot be reduced. Therefore, it is desirable to reduce the size of a region which is subjected to the prediction process when performing the prediction process on an image signal pattern having a large change in time and space, thereby reducing the electric power and entropy of the prediction error signal even though the data volume of the parameters which are used for the prediction is increased. In order to carry out encoding which is adapted for such the typical characteristics of a video signal, the moving image encoding device in accordance with this Embodiment 1 hierarchically divides each region having a predetermined maximum block size of the video signal into blocks, and carries out the prediction process and the encoding process of encoding a prediction error on each of the blocks into which each region is divided.

A video signal which is to be processed by the moving image encoding device in accordance with this Embodiment 1 can be an arbitrary video signal in which each video frame consists of a series of digital samples (pixels) in two dimensions, horizontal and vertical, such as a YUV signal which consists of a luminance signal and two color difference signals, a color video image signal in arbitrary color space, such as an RGB signal, outputted from a digital image sensor, a monochrome image signal, or an infrared image signal. The gradation of each pixel can be an 8-bit, 10-bit, or 12-bit one. In the following explanation, the inputted video signal is a YUV signal unless otherwise specified. It is further assumed that the two color difference components U and V are signals having a 4:2:0 format which are sub-sampled with respect to the luminance component Y. A data unit to be processed which corresponds to each frame of the video signal is referred to as a "picture." In this Embodiment 1, a "picture" is explained as a video frame signal on which progressive scanning has been carried out. When the video signal is an interlaced signal, a "picture" can be alternatively a field image signal which is a unit which constructs a video frame.

FIG. 1 is a block diagram showing a moving image encoding device in accordance with Embodiment 1 of the present invention. Referring to FIG. 1, an encoding controlling part 1 carries out a process of determining a maximum size of each of coding blocks which is a unit to be processed at a time when an intra prediction process (intra-frame prediction process) or a motion-compensated prediction process (inter-frame prediction process) is carried out, and also determining an upper limit on the number of hierarchical layers in a hierarchy in which each of the coding blocks having the maximum size is hierarchically divided into blocks. The encoding controlling part 1 also carries out a process of selecting an encoding mode suitable for each of the coding blocks into which each coding block having the maximum size is divided hierarchically from one or more available encoding modes (one or more intra encoding modes and one or more inter encoding modes). The encoding controlling part 1 further carries out a process of determining a quantization parameter and a transformation block size which are used when a difference image is compressed for each coding block, and also determining intra prediction parameters or inter prediction parameters which are used when a prediction process is carried out for each coding block. The quantization parameter and the transformation block size are included in prediction error encoding parameters, and these prediction error encoding parameters are outputted to a transformation/quantization part 7, an inverse quantization/inverse transformation part 8, a variable length encoding part 13, and so on. The encoding controlling part 1 constructs an encoding controlling unit.

A block dividing part 2 carries out a process of, when receiving a video signal showing an inputted image, dividing the inputted image shown by the video signal into coding blocks each having the maximum size determined by the encoding controlling part 1, and also dividing each of the coding blocks into blocks hierarchically until the number of hierarchical layers reaches the upper limit on the number of hierarchical layers which is determined by the encoding controlling part 1. The block dividing part 2 constructs a block dividing unit. A selection switch 3 carries out a process of, when the encoding mode selected by the encoding controlling part 1 for the coding block, which is generated through the division by the block dividing part 2, is an intra encoding mode, outputting the coding block to an intra prediction part 4, and, when the encoding mode selected by the encoding controlling part 1 for the coding block, which is generated through the division by the block dividing part 2, is an inter encoding mode, outputting the coding block to a motion-compensated prediction part 5.

The intra prediction part 4 carries out a process of, when receiving the coding block, which is generated through the division by the block dividing part 2, from the selection switch 3, carrying out an intra prediction process on the coding block to generate a prediction image by using an already-encoded image signal in the frame on the basis of the intra prediction parameters outputted thereto from the encoding controlling part 1. After generating the above-mentioned prediction image, the intra prediction part 4 selects a filter from one or more filters which are prepared in advance according to the states of the various parameters associated with the encoding of the target block to be filtered, carries out a filtering process on the above-mentioned prediction image by using the filter, and outputs the prediction image on which the intra prediction part has carried out the filtering process to a subtracting part 6 and an adding part 9. The intra prediction part selects the above-mentioned filter in consideration of at least one of the following four parameters:

Parameter (1)
The block size of the above-mentioned prediction image
Parameter (2)
The quantization parameter determined by the encoding controlling part 1
Parameter (3)
The distance between the already-encoded image signal in the frame which is used when generating the prediction image and a target pixel to be filtered
Parameter (4)
The intra prediction parameters determined by the encoding controlling part 1
An intra prediction unit is comprised of the selection switch 3 and the intra prediction part 4.

The motion-compensated prediction part 5 carries out a process of, when an inter encoding mode is selected by the encoding controlling part 1 as an encoding mode suitable for the coding block, which is generated through the division by the block dividing part 2, performing a motion-compensated prediction process on the coding block to generate a prediction image by using one or more frames of reference images stored in a motion-compensated prediction frame memory 12 on the basis of the inter prediction parameters outputted thereto from the encoding controlling part 1. A motion-compensated prediction unit is comprised of the selection switch 3 and the motion-compensated prediction part 5.

The subtracting part 6 carries out a process of subtracting the prediction image generated by the intra prediction part 4 or the motion-compensated prediction part 5 from the coding block, which is generated through the division by the block dividing part 2, to generate a difference image (=the coding block−the prediction image). The subtracting part 6 constructs a difference image generating unit. The transformation/quantization part 7 carries out a process of performing a transformation process (e.g., a DCT (discrete cosine transform) or an orthogonal transformation process, such as a KL transform, in which bases are designed for a specific learning sequence in advance) on the difference signal generated by the subtracting part 6 in units of a block having a transformation block size included in the prediction error encoding parameters outputted thereto from the encoding controlling part 1, and also quantizing the transform coefficients of the difference image by using a quantization parameter included in the prediction error encoding parameters to output the transform coefficients quantized thereby as compressed data of the difference image. The transformation/quantization part 7 constructs an image compression unit.

The inverse quantization/inverse transformation part 8 carries out a process of inverse-quantizing the compressed data outputted thereto from the transformation/quantization part 7 by using the quantization parameter included in the prediction error encoding parameters outputted thereto from the encoding controlling part 1, and performing an inverse transformation process (e.g., an inverse DCT (inverse discrete cosine transform) or an inverse transformation process such as an inverse KL transform) on the compressed data inverse-quantized thereby in units of a block having the transformation block size included in the prediction error encoding parameters to output the compressed data on which the inverse quantization/inverse transformation part has carried out the inverse transformation process as a local decoded prediction error signal.

The adding part 9 carries out a process of adding the local decoded prediction error signal outputted thereto from the inverse quantization/inverse transformation part 8 and the prediction signal showing the prediction image generated by the intra prediction part 4 or the motion-compensated prediction part 5 to generate a local decoded image signal showing a local decoded image. A memory 10 for intra prediction is a recording medium, such as a RAM, for storing the local decoded image shown by the local decoded image signal generated by the adding part 9 as an image which the intra prediction part 4 will use when performing the intra prediction process the next time.

A loop filter part 11 carries out a process of compensating for an encoding distortion included in the local decoded image signal generated by the adding part 9, and outputting the local decoded image shown by the local decoded image signal on which the loop filter part has carried out the encoding distortion compensation to a motion-compensated prediction frame memory 12 as a reference image. The motion-compensated prediction frame memory 12 is a recording medium, such as a RAM, for storing the local decoded image on which the loop filter part 11 has carried out the filtering process as a reference image which the motion-compensated prediction part 5 will use when performing the motion-compensated prediction process the next time.

The variable length encoding part 13 carries out a process of variable-length-encoding the compressed data outputted thereto from the transformation/quantization part 7, the encoding mode and the prediction error encoding parameters which are outputted thereto from the encoding controlling part 1, and the intra prediction parameters outputted thereto from the intra prediction part 4 or the inter prediction parameters outputted thereto from the motion-compensated prediction part 5 to generate a bitstream into which encoded data of the compressed data, encoded data of the encoding mode, encoded data of the prediction error encoding parameters, and encoded data of the intra prediction parameters or the inter prediction parameters are multiplexed. The variable length encoding part 13 constructs a variable length encoding unit.

Figure 2:
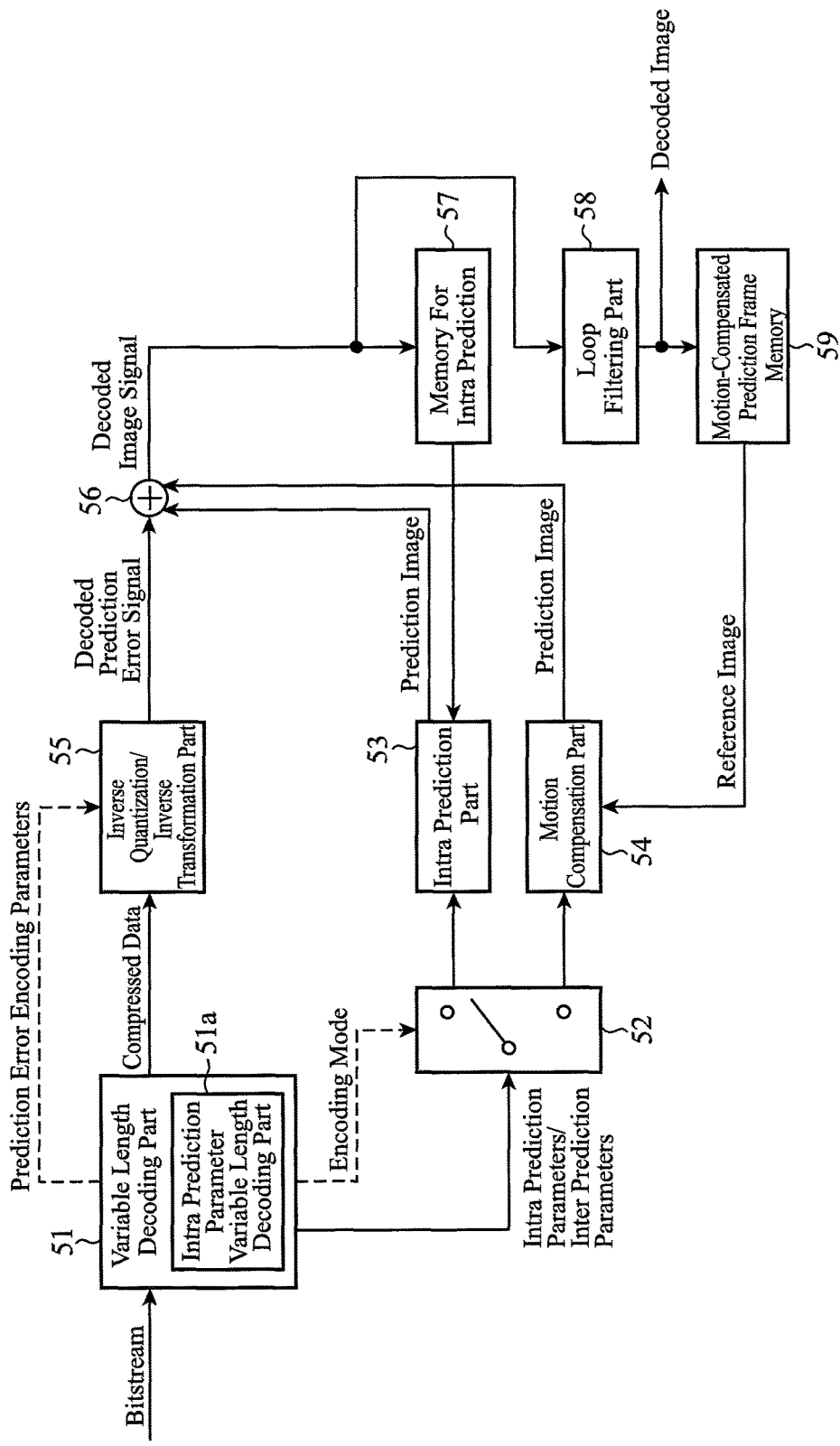
FIG. 2 is a block diagram showing a moving image decoding device in accordance with Embodiment 1 of the present invention.

FIG. 2 is a block diagram showing the moving image decoding device in accordance with Embodiment 1 of the present invention. Referring to FIG. 2, a variable length decoding part 51 carries out a process of variable-length-decoding the encoded data multiplexed into the bitstream to obtain the compressed data, the encoding mode, the prediction error encoding parameters, and the intra prediction parameters or the inter prediction parameters, which are associated with each coding block into which each frame of the video is hierarchically divided, and outputting the compressed data and the prediction error encoding parameters to an inverse quantization/inverse transformation part 55, and also outputting the encoding mode and the intra prediction parameters or the inter prediction parameters to a selection switch 52. The variable length decoding part 51 constructs a variable length decoding unit.

The selection switch 52 carries out a process of, when the encoding mode associated with the coding block, which is outputted from the variable length decoding part 51, is an intra encoding mode, outputting the intra prediction parameters outputted thereto from the variable length decoding part 51 to an intra prediction part 53, and, when the encoding mode is an inter encoding mode, outputting the inter prediction parameters outputted thereto from the variable length decoding part 51 to a motion-compensated prediction part 54.

The intra prediction part 53 carries out a process of performing an intra-frame prediction process on the coding block to generate a prediction image by using an already-decoded image signal in the frame on the basis of the intra prediction parameters outputted thereto from the selection switch 52. After generating the above-mentioned prediction image, the intra prediction part 53 selects a filter from one or more filters which are prepared in advance according to the states of the various parameters associated with the decoding of the target block to be filtered, carries out a filtering process on the above-mentioned prediction image by using the filter, and outputs the prediction image on which the intra prediction part has carried out the filtering process to an adding part 56. The intra prediction part selects the above-mentioned filter in consideration of at least one of the following four parameters:

Parameter (1)
The block size of the above-mentioned prediction image
Parameter (2)
The quantization parameter variable-length-decoded by the variable length decoding part 51

Parameter (3)

The distance between the already-decoded image signal in the frame which is used when generating the prediction image and a target pixel to be filtered Parameter (4)

The intra prediction parameters variable-length-decoded by the variable length decoding part 51

An intra prediction unit is comprised of the selection switch 52 and the intra prediction part 53.

The motion-compensated prediction part 54 carries out a process of performing a motion-compensated prediction process on the coding block to generate a prediction image by using one or more frames of reference images stored in a motion-compensated prediction frame memory 59 on the basis of the inter prediction parameters outputted thereto from the selection switch 52. A motion-compensated prediction unit is comprised of the selection switch 52 and the motion-compensated prediction part 54.

The inverse quantization/inverse transformation part 55 carries out a process of inverse-quantizing the compressed data associated with the coding block, which is outputted thereto from the variable length decoding part 51, by using the quantization parameter included in the prediction error encoding parameters outputted thereto from the variable length decoding part 51, and performing an inverse transformation process (e.g., an inverse DCT (inverse discrete cosine transform) or an inverse transformation process such as an inverse KL transform) on the compressed data inverse-quantized thereby in units of a block having the transformation block size included in the prediction error encoding parameters, and outputting the compressed data on which the inverse quantization/inverse transformation part has carried out the inverse transformation process as a decoded prediction error signal (signal showing a pre-compressed difference image). The inverse quantization/inverse transformation part 55 constructs a difference image generating unit.

The adding part 56 carries out a process of adding the decoded prediction error signal outputted thereto from the inverse quantization/inverse transformation part 55 and the prediction signal showing the prediction image generated by the intra prediction part 53 or the motion-compensated prediction part 54 to generate a decoded image signal showing a decoded image. The adding part 56 constructs a decoded image generating unit. A memory 57 for intra prediction is a recording medium, such as a RAM, for storing the decoded image shown by the decoded image signal generated by the adding part 56 as an image which the intra prediction part 53 will use when performing the intra prediction process the next time.

A loop filter part 58 carries out a process of compensating for an encoding distortion included in the decoded image signal generated by the adding part 56, and outputting the decoded image shown by the decoded image signal on which the loop filter part performs the encoding distortion compensation to a motion-compensated prediction frame memory 59 as a reference image. The motion-compensated prediction frame memory 59 is a recording medium, such as a RAM, for storing the decoded image on which the loop filter part 58 performs the filtering process as a reference image which the motion-compensated prediction part 54 will use when performing the motion-compensated prediction process the next time.

Figure 3:
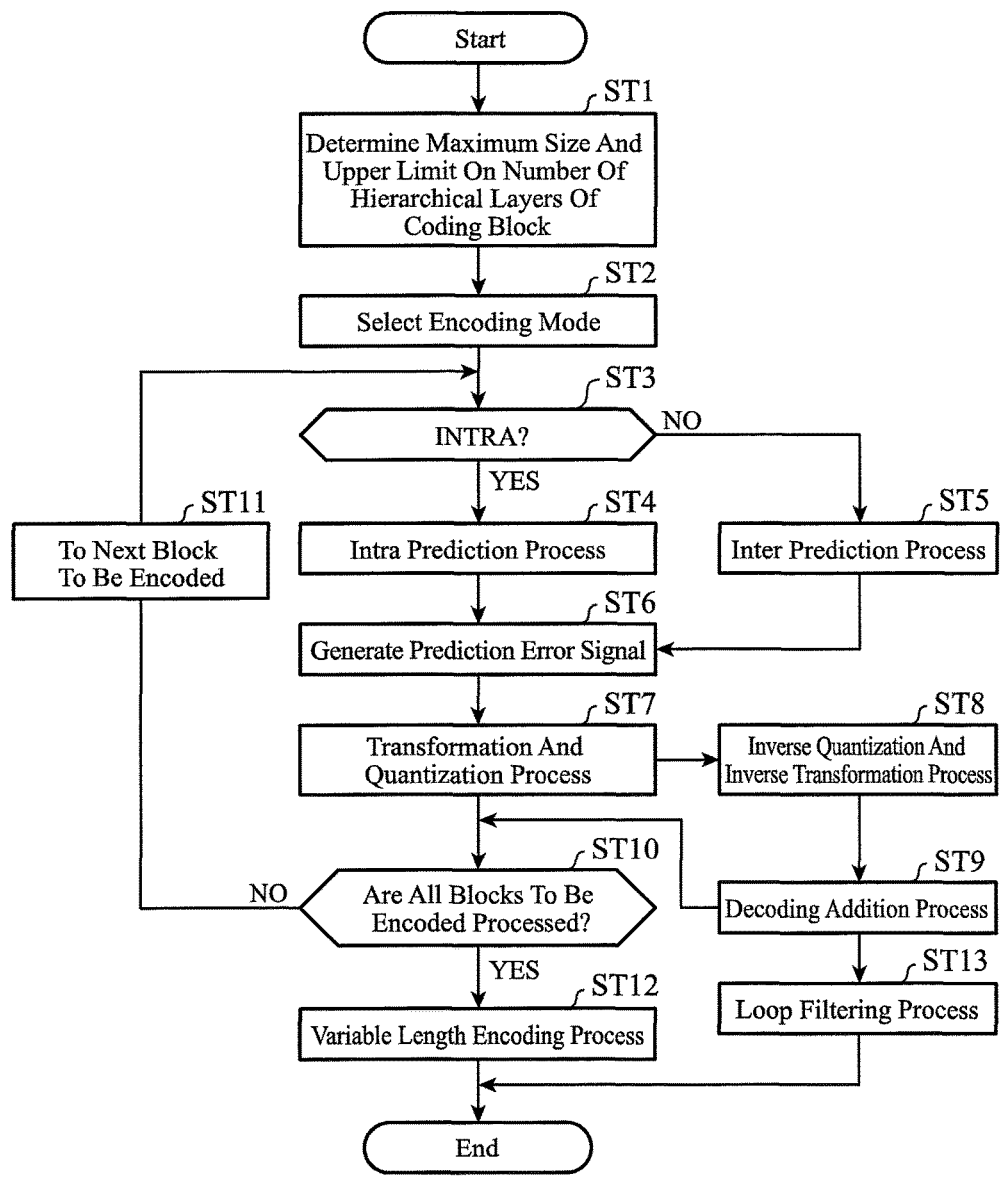
FIG. 3 is a flow chart showing processing carried out by the moving image encoding device in accordance with Embodiment 1 of the present invention.

In the example shown in FIG. 1, the encoding controlling part 1, the block dividing part 2, the selection switch 3, the intra prediction part 4, the motion-compensated prediction part 5, the subtracting part 6, the transformation/quantization part 7, the inverse quantization/inverse transformation part 8, the adding part 9, the loop filter part 11, and the variable length encoding part 13, which are the components of the moving image encoding device, can consist of pieces of hardware for exclusive use (e.g., integrated circuits in each of which a CPU is mounted, one chip microcomputers, or the like), respectively. As an alternative, the moving image encoding device can consist of a computer, and a program in which the processes carried out by the encoding controlling part 1, the block dividing part 2, the selection switch 3, the intra prediction part 4, the motion-compensated prediction part 5, the subtracting part 6, the transformation/quantization part 7, the inverse quantization/inverse transformation part 8, the adding part 9, the loop filter part 11, and the variable length encoding part 13 are described can be stored in a memory of the computer and the CPU of the computer can be made to execute the program stored in the memory. FIG. 3 is a flow chart showing the processing carried out by the moving image encoding device in accordance with Embodiment 1 of the present invention.

Figure 4:
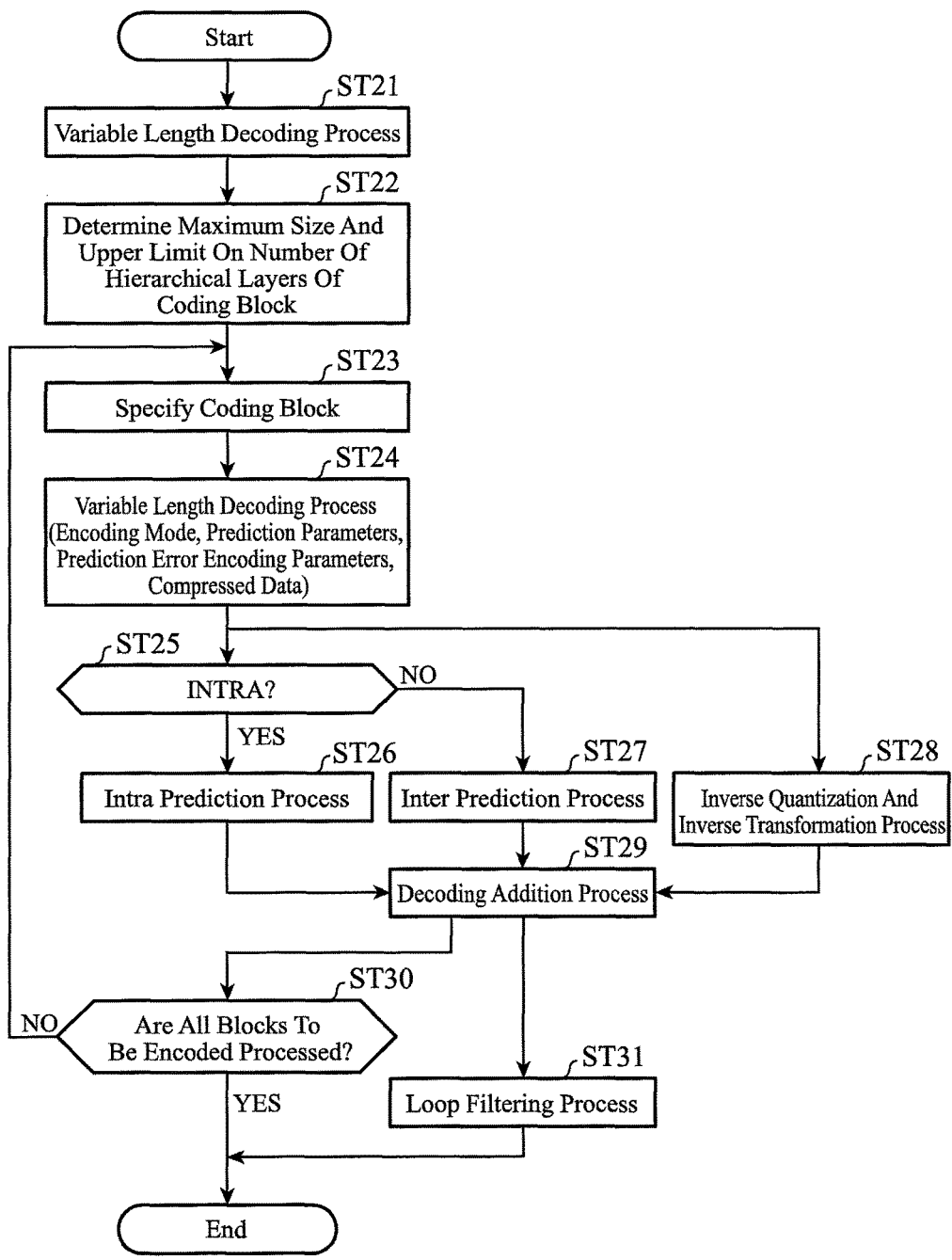
FIG. 4 is a flow chart showing processing carried out by the moving image decoding device in accordance with Embodiment 1 of the present invention.

In the example shown in FIG. 2, the variable length decoding part 51, the selection switch 52, the intra prediction part 53, the motion-compensated prediction part 54, the inverse quantization/inverse transformation part 55, the adding part 56, and the loop filter part 58, which are the components of the moving image decoding device, can consist of pieces of hardware for exclusive use (e.g., integrated circuits in each of which a CPU is mounted, one chip microcomputers, or the like), respectively. As an alternative, the moving image decoding device can consist of a computer, and a program in which the processes carried out by the variable length decoding part 51, the selection switch 52, the intra prediction part 53, the motion-compensated prediction part 54, the inverse quantization/inverse transformation part 55, the adding part 56, and the loop filter part 58 are described can be stored in a memory of the computer and the CPU of the computer can be made to execute the program stored in the memory. FIG. 4 is a flow chart showing the processing carried out by the moving image decoding device in accordance with Embodiment 1 of the present invention.

Next, the operation of the moving image encoding device and the operation of the moving image decoding device will be explained. First, the processing carried out by the moving image encoding device shown in FIG. 1 will be explained. First, the encoding controlling part 1 determines a maximum size of each of coding blocks which is a unit to be processed at a time when an intra prediction process (intra-frame prediction process) or a motion-compensated prediction process (inter-frame prediction process) is carried out, and also determines an upper limit on the number of hierarchical layers in a hierarchy in which each of the coding blocks having the maximum size is hierarchically divided into blocks (step ST1 of FIG. 3).

As a method of determining the maximum size of each of coding blocks, for example, there is considered a method of determining a maximum size for all the pictures according to the resolution of the inputted image. Further, there can be considered a method of quantifying a variation in the complexity of a local movement of the inputted image as a parameter and then determining a small size for a picture having a large and vigorous movement while determining a large size for a picture having a small movement. As a method of determining the upper limit on the number of hierarchical layers, for example, there can be considered a method of increasing the depth of the hierarchy, i.e., the number of hierarchical layers to make it possible to detect a finer movement as the inputted image has a larger and more vigorous movement, or decreasing the depth of the hierarchy, i.e., the number of hierarchical layers as the inputted image has a smaller movement.

The encoding controlling part 1 also selects an encoding mode suitable for each of the coding blocks into which each coding block having the maximum size is divided hierarchically from one or more available encoding modes (M intra encoding modes and N inter encoding modes) (step ST2). Although a detailed explanation of the selection method of selecting an encoding mode for use in the encoding controlling part 1 will be omitted because the selection method is a known technique, there is a method of carrying out an encoding process on the coding block by using an arbitrary available encoding mode to examine the encoding efficiency and select an encoding mode having the highest level of encoding efficiency from among a plurality of available encoding modes, for example.

The encoding controlling part 1 further determines a quantization parameter and a transformation block size which are used when a difference image is compressed for each coding block, and also determines intra prediction parameters or inter prediction parameters which are used when a prediction process is carried out. The encoding controlling part 1 outputs prediction error encoding parameters including the quantization parameter and the transformation block size to the transformation/quantization part 7, the inverse quantization/inverse transformation part 8, and the variable length encoding part 13. The encoding controlling part also outputs the prediction error encoding parameters to the intra prediction part 4 as needed.

Figure 5:
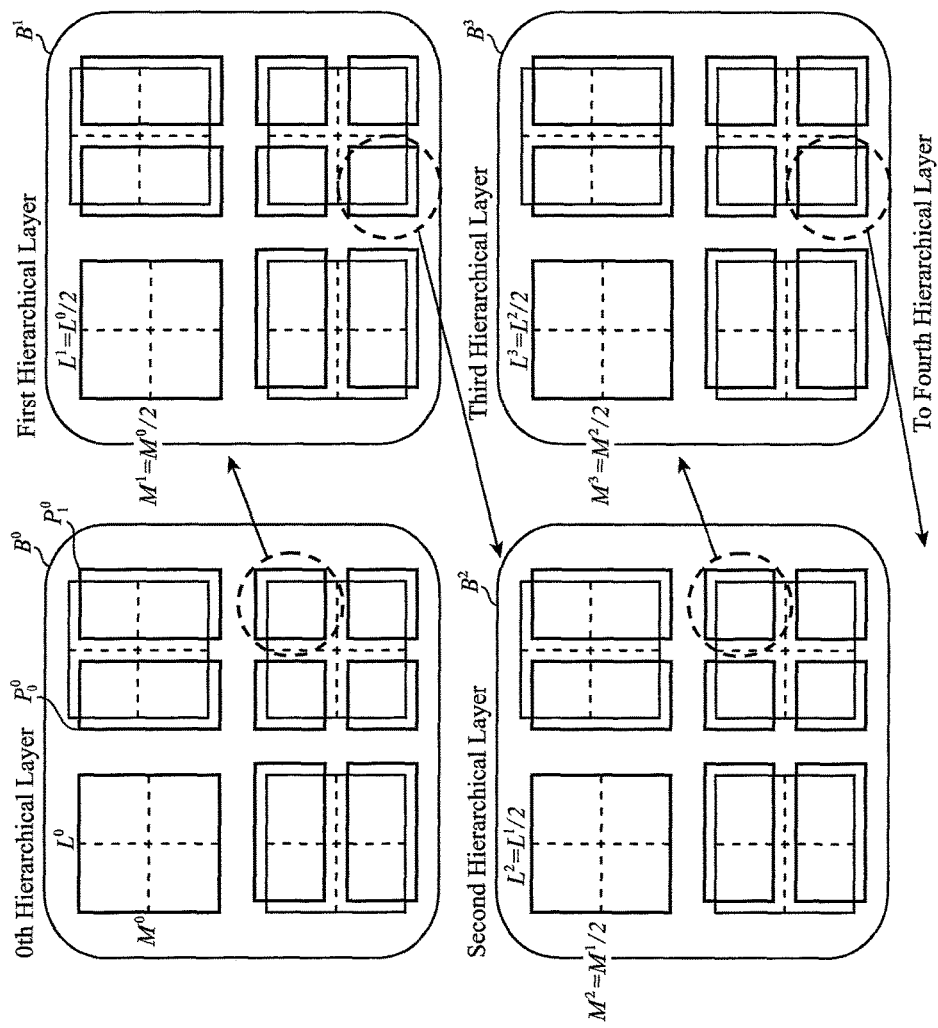
FIG. 5 is an explanatory drawing showing a state in which each coding block having a maximum size is hierarchically divided into a plurality of coding blocks.

When receiving the video signal showing the inputted image, the block dividing part 2 divides the inputted image shown by the video signal into coding blocks each having the maximum size determined by the encoding controlling part 1, and also divides each of the coding blocks into blocks hierarchically until the number of hierarchical layers reaches the upper limit on the number of hierarchical layers which is determined by the encoding controlling part 1. FIG. 5 is an explanatory drawing showing a state in which each coding block having the maximum size is hierarchically divided into a plurality of coding blocks. In the example of FIG. 5, each coding block having the maximum size is a coding block $B_0$ in the 0th hierarchical layer, and its luminance component has a size of ($L^0$, $M^0$). Further, in the example of FIG. 5, by carrying out the hierarchical division with this coding block $B_0$ having the maximum size being set as a starting point until the depth of the hierarchy reaches a predetermined depth which is set separately according to a quadtree structure, coding blocks $B^n$ can be obtained.

At the depth of n, each coding block $B^n$ is an image area having a size of ($L^n$, $M^n$). Although $L^n$ can be the same as or differ from $M^n$, the case of $L^n = M^n$ is shown in the example of FIG. 5. Hereafter, the size of each coding block $B^n$ is defined as the size of ($L^n$, $M^n$) in the luminance component of the coding block $B^n$.

Because the block dividing part 2 carries out a quadtree division, ($L^{n+1}$, $M^{n+1}$)=($L^n/2$, $M^n/2$) is always established. In the case of a color video image signal (4:4:4 format) in which all the color components have the same sample number, such as an RGB signal, all the color components have a size of ($L^n$, $M^n$), while in the case of handling a 4:2:0 format, a corresponding color difference component has an encoding block size of ($L^n/2$, $M^n/2$). Hereafter, an encoding mode selectable for each coding block $B^n$ in the nth hierarchical layer is expressed as m($B^n$).

In the case of a color video signal which consists of a plurality of color components, the encoding mode m($B^n$) can be formed in such a way that an individual mode is used for each color component. Hereafter, an explanation will be made by assuming that the encoding mode m($B^n$) indicates the one for the luminance component of each coding block having a 4:2:0 format in a YUV signal unless otherwise specified. The encoding mode m($B^n$) can be one of one or more intra encoding modes (generically referred to as "INTRA") or one or more inter encoding modes (generically referred to as "INTER"), and the encoding controlling part 1 selects, as the encoding mode m($B^n$), an encoding mode with the highest degree of encoding efficiency for each coding block $B^n$ from among all the encoding modes available in the picture currently being processed or a subset of these encoding modes, as mentioned above.

Each coding block $B^n$ is further divided into one or more prediction units (partitions) by the block dividing part, as shown in FIG. 5. Hereafter, each partition belonging to each coding block $B^n$ is expressed as $P_i^n$ (i shows a partition number in the nth hierarchical layer). How the division of each coding block $B^n$ into partitions $P_i^n$ belonging to the coding block $B^n$ is carried out is included as information in the encoding mode m($B^n$). While the prediction process is carried out on each of all the partitions $P_i^n$ according to the encoding mode m($B^n$), an individual prediction parameter can be selected for each partition $P_i^n$.

Figure 6:
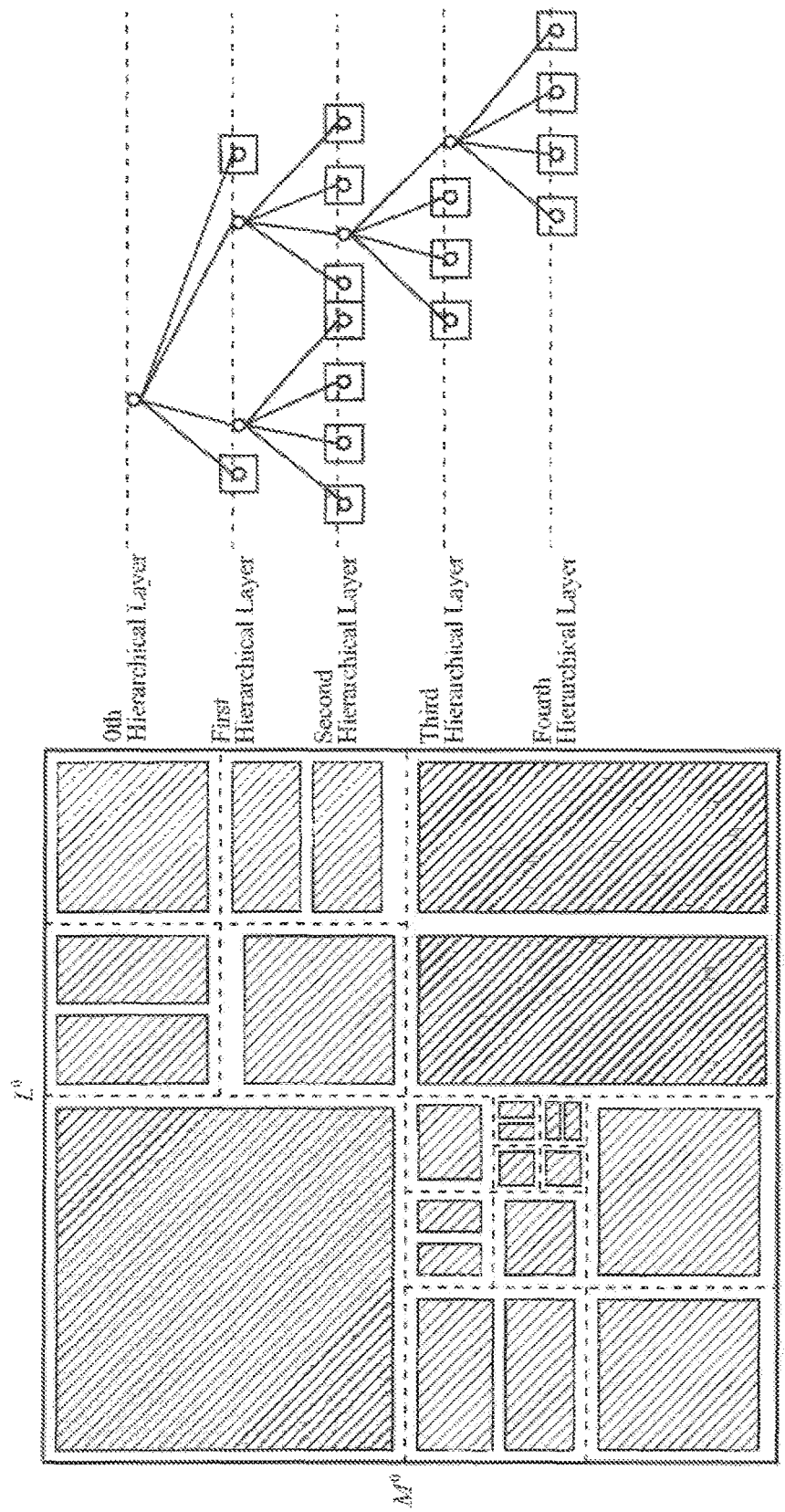
FIG. 6($a$) is an explanatory drawing showing a distribution of partitions into which a block to encoded is divided, and FIG. 6($b$) is an explanatory drawing showing a state in which an encoding mode m($B^n$) is assigned to each of the partitions after a hierarchical layer division is performed by using a quadtree graph.

The encoding controlling part 1 produces such a block division state as shown in, for example, FIGS. 6(a) and 6(b) for a coding block having the maximum size, and then determines coding blocks $B^n$. Hatched portions shown in FIG. 6(a) show a distribution of partitions into which the coding block having the maximum size is divided, and FIG. 6(b) shows a situation in which encoding modes m($B^n$) are respectively assigned to the partitions generated through the hierarchical layer division by using a quadtree graph. Each node enclosed by □ shown in FIG. 6(b) is a node (coding block $B^n$) to which an encoding mode m($B^n$) is assigned.

When the encoding controlling part 1 selects an optimal encoding mode m($B^n$) for each partition $P_i^n$ of each coding block $B^n$, and the encoding mode m($B^n$) is an intra encoding mode (step ST3), the selection switch 3 outputs the partition $P_i^n$ of the coding block $B^n$, which is generated through the division by the block dividing part 2, to the intra prediction part 4. In contrast, when the encoding mode m ($B^n$) is an inter encoding mode (step ST3), the selection switch outputs the partition $P_i^n$ of the coding block $B^n$, which is generated through the division by the block dividing part 2, to the motion-compensated prediction part 5.

When receiving the partition $P_i^n$ of the coding block $B^n$ from the selection switch 3, the intra prediction part 4 carries out an intra prediction process on the partition $P_i^n$ of the coding block $B^n$ to generate an intra prediction image $P_i^n$ by using an already-encoded image signal in the frame on the basis of the intra prediction parameters outputted thereto from the encoding controlling part 1 (step ST4). After generating the above-mentioned intra prediction image $P_i^n$, the intra prediction part 4 selects a filter from one or more filters which are prepared in advance according to the states of the various parameters associated with the encoding of the target block to be filtered, and carries out a filtering process on the intra prediction image $P_i^n$ by using the filter. After carrying out the filtering process on the intra prediction image $P_i^n$, the intra prediction part 4 outputs the intra prediction image $P_i^n$ on which the intra prediction part has carried out the filtering process to the subtracting part 6 and the adding part 9. In order to enable the moving image decoding device shown in FIG. 2 to also be able to generate the same intra prediction image $P_i^n$, the intra prediction part outputs the intra prediction parameters to the variable length encoding part 13. The outline of the process carried out by the intra prediction part 4 is as mentioned above, and the details of this process will be mentioned below.

When receiving the partition $P_i^n$ of the coding block $B^n$ from the selection switch 3, the motion-compensated prediction part 5 carries out a motion-compensated prediction process on the partition $P_i^n$ of the coding block $B^n$ to generate an inter prediction image $P_i^n$ by using one or more frames of reference images stored in the motion-compensated prediction frame memory 12 on the basis of the inter prediction parameters outputted thereto from the encoding controlling part 1 (step ST5). Because a technology of carrying out a motion-compensated prediction process to generate a prediction image is known, the detailed explanation of this technology will be omitted hereafter.

After the intra prediction part 4 or the motion-compensated prediction part 5 generates the prediction image (an intra prediction image $P_i^n$ or an inter prediction image $P_i^n$), the subtracting part 6 subtracts the prediction image (the intra prediction image $P_i^n$ or the inter prediction image $P_i^n$) generated by the intra prediction part 4 or the motion-compensated prediction part 5 from the partition $P_i^n$ of the coding block $B^n$, which is generated through the division by the block dividing part 2, to generate a difference image, and outputs a prediction error signal $e_i^n$ showing the difference image to the transformation/quantization part 7 (step ST6).

When receiving the prediction error signal $e_i^n$ showing the difference image from the subtracting part 6, the transformation/quantization part 7 carries out a transformation process (e.g., a DCT (discrete cosine transform) or an orthogonal transformation process, such as a KL transform, in which bases are designed for a specific learning sequence in advance) on the difference image in units of a block having the transformation block size included in the prediction error encoding parameters outputted thereto from the encoding controlling part 1, and quantizes the transform coefficients of the difference image by using the quantization parameter included in the prediction error encoding parameters and outputs the transform coefficients quantized thereby to the inverse quantization/inverse transformation part 8 and the variable length encoding part 13 as compressed data of the difference image (step ST7).

When receiving the compressed data of the difference image from the transformation/quantization part 7, the inverse quantization/inverse transformation part 8 inverse-quantizes the compressed data of the difference image by using the quantization parameter included in the prediction error encoding parameters outputted thereto from the encoding controlling part 1, performs an inverse transformation process (e.g., an inverse DCT (inverse discrete cosine transform) or an inverse transformation process such as an inverse KL transform) on the compressed data inverse-quantized thereby in units of a block having the transformation block size included in the prediction error encoding parameters, and outputs the compressed data on which the inverse quantization/inverse transformation part has carried out the inverse transformation process to the adding part 9 as a local decoded prediction error signal $e_i^n$ hat ("^" attached to an alphabetical letter is expressed by hat for reasons of the restrictions on electronic applications) (step ST8).

When receiving the local decoded prediction error signal $e_i^n$ hat from the inverse quantization/inverse transformation part 8, the adding part 9 adds the local decoded prediction error signal $e_i^n$ hat and the prediction signal showing the prediction image (the intra prediction image $P_i^n$ or the inter prediction image $P_i^n$) generated by the intra prediction part 4 or the motion-compensated prediction part 5 to generate a local decoded image which is a local decoded partition image $P_i^n$ hat or a local decoded coding block image which is a group of local decoded partition images (step ST9). After generating the local decoded image, the adding part 9 stores a local decoded image signal showing the local decoded image in the memory 10 for intra prediction and also outputs the local decoded image signal to the loop filter part 11.

The moving image encoding device repeatedly carries out the processes of steps ST3 to ST9 until the moving image encoding device completes the processing on all the coding blocks $B^n$ into which the inputted image is divided hierarchically, and, when completing the processing on all the coding blocks $B^n$, shifts to a process of step ST12 (steps ST10 and ST11).

The variable length encoding part 13 entropy-encodes the compressed data outputted thereto from the transformation/quantization part 7, the encoding mode (including the information showing the state of the division into the coding blocks) and the prediction error encoding parameters, which are outputted thereto from the encoding controlling part 1, and the intra prediction parameters outputted thereto from the intra prediction part 4 or the inter prediction parameters outputted thereto from the motion-compensated prediction part 5. The variable length encoding part 13 multiplexes encoded data which are the encoded results of the entropy encoding of the compressed data, the encoding mode, the prediction error encoding parameters, and the intra prediction parameters or the inter prediction parameters to generate a bitstream (step ST12).

When receiving the local decoded image signal from the adding part 9, the loop filter part 11 compensates for an encoding distortion included in the local decoded image signal, and stores the local decoded image shown by the local decoded image signal on which the loop filter part performs the encoding distortion compensation in the motion-compensated prediction frame memory 12 as a reference image (step ST13). The loop filter part 11 can carry out the filtering process for each coding block having the maximum size of the local decoded image signal outputted thereto from the adding part 9 or for each coding block of the local decoded image signal, or for each unit which is a combination of a plurality of coding blocks each having the maximum size. As an alternative, after one picture of local decoded image signals is outputted, the loop filter part can carry out the filtering process on the picture of local decoded image signals at a time.

Next, the process carried out by the intra prediction unit 4 will be explained in detail. FIG. 7 is an explanatory drawing showing an example of the intra prediction parameters (intra prediction mode) which can be selected for each partition $P_i^n$ in the coding block $B^n$. In the example shown in FIG. 7, intra prediction modes and prediction direction vectors represented by each of the intra prediction modes are shown, and it is designed that a relative angle between prediction direction vectors becomes small with increase in the number of selectable intra prediction modes.

The intra prediction part 4 carries out an intra prediction process on the partition $P_i^n$ on the basis of the intra prediction parameters for the partition $P_i^n$ and a selection parameter for a filter which the intra prediction part uses for the generation of an intra prediction image $P_i^n$. Hereafter, an intra process of generating an intra prediction signal of the luminance signal on the basis of the intra prediction parameters (intra prediction mode) for the luminance signal of the partition $P_i^n$ will be explained.

Figure 8:
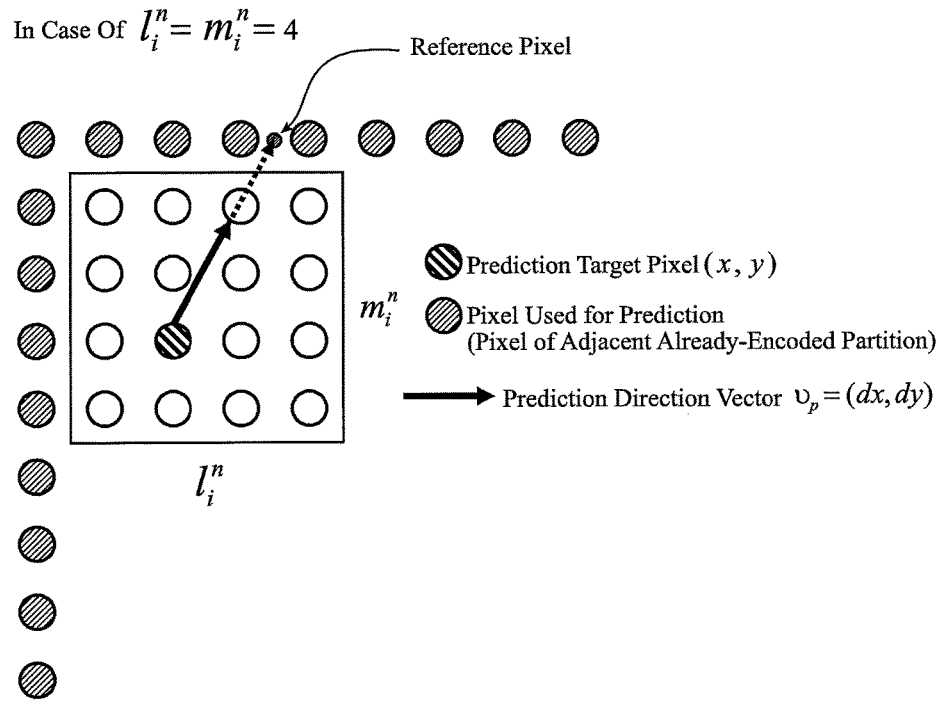
FIG. 8 is an explanatory drawing showing an example of pixels which are used when generating a predicted value of each pixel in a partition $P_i^n$ in the case of $l_i^n = m_i^n = 4$.

Hereafter, the partition $P_i^n$ is assumed to have a size of $l_i^n \times m_i^n$ pixels. FIG. 8 is an explanatory drawing showing an example of pixels which are used when generating a predicted value of each pixel in the partition $P_i^n$ in the case of $l_i^n = m_i^n = 4$. Although the $(2 \times l_i^n + 1)$ pixels in the already-encoded upper partition which is adjacent to the partition $P_i^n$ and the $(2 \times m_i^n)$ pixels in the already-encoded left partition which is adjacent to the partition $P_i^n$ are set as the pixels used for prediction in the example of FIG. 8, a larger or smaller number of pixels than the pixels shown in FIG. 8 can be used for prediction. Further, although one row or column of pixels adjacent to the partition are used for prediction in the example shown in FIG. 8, two or more rows or columns of pixels adjacent to the partition can be alternatively used for prediction.

When the index value indicating the intra prediction mode for the partition $P_i^n$ is 2 (average prediction), the intra prediction part generates an intermediate prediction image by using the average of the adjacent pixels in the upper partition and the adjacent pixels in the left partition as the predicted value of each pixel in the partition $P_i^n$. When the index value indicating the intra prediction mode is other than 2 (average prediction), the intra prediction part generates the predicted value of each pixel in the partition $P_i^n$ on the basis of a prediction direction vector $v_p = (dx, dy)$ shown by the index value. In this case, the relative coordinate of the pixel (the pixel at the upper left corner of the partition is set as the point of origin) for which the predicted value is to be generated (target pixel for prediction) in the partition $P_i^n$ is expressed as (x, y). Each reference pixel which is used for prediction is located at a point of intersection of A shown below and an adjacent pixel.

$$L = \begin{pmatrix} x \\ y \end{pmatrix} + k v_p$$

where k is a positive scalar value.

When a reference pixel is located at an integer pixel position, the integer pixel is set as the predicted value of the target pixel for prediction. In contrast, when a reference pixel is not located at an integer pixel position, an interpolation pixel which is generated from an integer pixel adjacent to the reference pixel is set as the predicted value of the target pixel for prediction. In the example shown in FIG. 8, because a reference pixel is not located at an integer pixel position, the predicted value is interpolated from the values of two pixels adjacent to the reference pixel. However, the interpolation of the predicted value is not limited to the one from the values of two adjacent pixels, and an interpolation pixel can be generated from two or more adjacent pixels and the value of this interpolation pixel can be set as the predicted value.

Next, the intra prediction part obtains a final prediction image by carrying out a filtering process on the intermediate prediction image (predicted value) generated according to the above-mentioned procedure. Hereafter, the filtering process will be explained concretely.

The intra prediction part selects a filter to be used from one or more filters which are prepared in advance by using a method which will be mentioned below, and carries out a filtering process on each pixel of the intermediate prediction image according to the following equation (1).

$$\hat{s}(p_0) = a_0 s(p_0) + a_1 s(p_1) + \ldots + a_{N-1} s(p_{N-1}) + a_N \quad (1)$$

Figure 9:
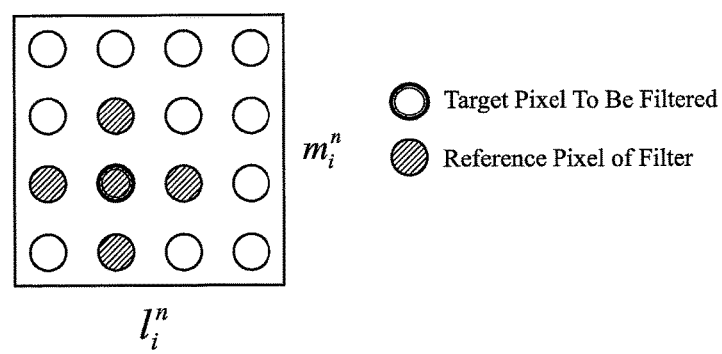
FIG. 9 is an explanatory drawing showing an example of the arrangement of reference pixels in the case of N=5.
Figure 10:
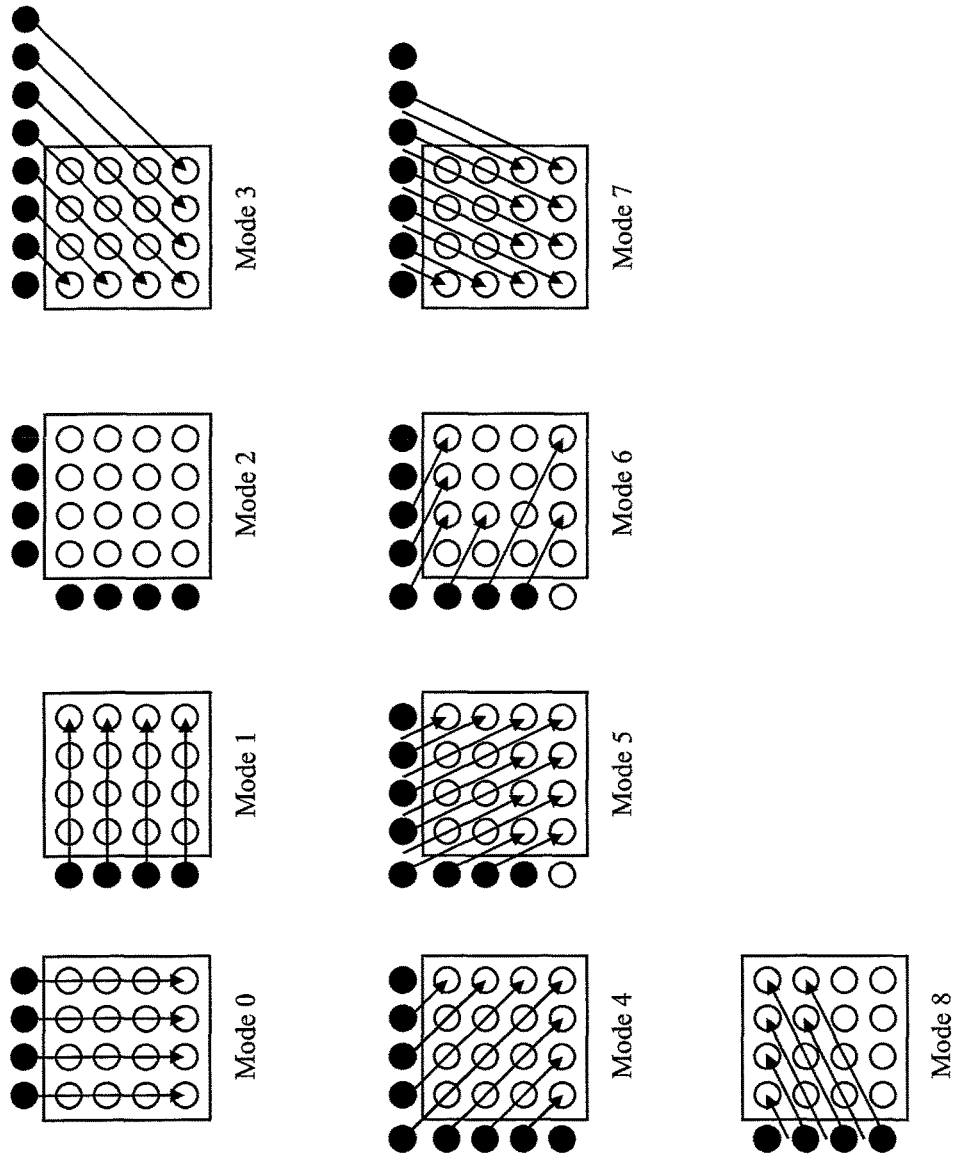
FIG. 10 is an explanatory drawing showing intra prediction modes in the case of a 4×4 pixel block size for luminance.

In the equation (1), $a_n$ (n=0, 1, ..., N) is filter coefficients which consist of coefficients $(a_0, a_1, \ldots, a_{N-1})$ associated with the reference pixels, and an offset coefficient $a_N$. $p_n$ (n=0, 1, ..., N−1) shows the reference pixels of the filter including the target pixel $p_0$ to be filtered. $s(p_n)$ shows the luminance value of each reference pixel, and $\hat{s}(p_0)$ shows the luminance value of the target pixel $p_0$ to be filtered on which the filtering process has been carried out. The filter coefficients can be formed so as not to include the offset coefficient $a_N$. Further, N is an arbitrary number of reference pixels. FIG. 9 is an explanatory drawing showing an example of the arrangement of the reference pixels in the case of N=5.

When carrying out the above-mentioned filtering process, a nonlinear edge or the like occurs in the inputted image more easily and hence a displacement from the prediction direction of the intermediate prediction image occurs more easily with increase in the size ($l_i^n \times m_i^n$) of the partition $P_i^n$. Therefore, it is preferable to smooth the intermediate prediction image. In addition, the larger quantized value a prediction error has, the larger quantization distortion occurs in the decoded image and hence the lower degree of prediction accuracy the intermediate prediction image generated from already-encoded pixels which are adjacent to the partition $P_i^n$ has. Therefore, it is preferable to prepare a smoothed prediction image which roughly expresses the partition $P_i^n$. Further, even a pixel in the same partition $P_i^n$ has a displacement, such as an edge, occurring between the intermediate prediction image and the inputted image more easily with distance from the already-encoded pixels adjacent to the partition $P_i^n$ which are used for the generation of the intermediate prediction image. Therefore, it is preferable to smooth the prediction image to suppress the rapid increase in the prediction error which is caused when a displacement occurs. In addition, it is necessary to not only change the intensity of the filter, but also arrange the reference pixels of the filter appropriately according to the prediction direction of the intermediate prediction image, thereby preventing a pattern, such as an edge of the intermediate prediction image, from being distorted unnaturally.

Therefore, the filter selecting process is configured in such a way as to select a filter in consideration of the four following parameters (1) to (4).

(1) The size of the partition $P_i^n$ ($l_i^n \times m_i^n$)
(2) The quantization parameter included in the prediction error encoding parameters
(3) The distance between the group of already-encoded pixels ("pixels which are used for prediction" shown in FIG. 8) which are used at the time of generating the intermediate prediction image, and the target pixel to be filtered
(4) The index value indicating the intra prediction mode at the time of generating the intermediate prediction image More specifically, the filter selecting process is configured in such a way that a filter having a higher degree of smoothing intensity is used with increase in the size ($l_i^n \times m_i^n$) of the partition $P_i^n$, with increase in the quantized value determined by the quantization parameter, and with distance between the target pixel to be filtered and the group of already-encoded pixels which are located on the left side and on the upper side of the partition $P_i^n$ and which are used at the time of generating the intermediate prediction image, and the filer has a degree of filter intensity which is determined in consideration of the prediction direction in the intra prediction mode and the reference pixels are arranged in consideration of the prediction direction in the intra prediction mode. More specifically, an adaptive selection of a filter according to the above-mentioned parameters is implemented by bringing an appropriate filter selected from among the group of filters which are prepared in advance into correspondence with each of combinations of the above-mentioned parameters. However, any number of selectable degrees of filter intensity can be provided as long as the number is two or more, and a filtering process equivalent to no filtering can be defined as an expression of a filter having the lowest degree of smoothing intensity. Therefore, the filtering process can be configured in such a way that the filtering process is carried out only on specific pixels in the intermediate prediction image, but a filtering process having the lowest degree of smoothing intensity, i.e., no filtering is carried out on any other pixels. Although the above explanation is made on the assumption that a necessary number of filters are prepared in advance, a filter can be alternatively defined as a function of the above-mentioned filter selection parameters in such a way that the filter is determined according to the values of the above-mentioned filter selection parameters.

Although the example of selecting a filter in consideration of the four parameters (1) to (4) is shown in the above explanation, a filter can be alternatively selected in consideration of at least one of the four parameters (1) to (4). In a case of taking into consideration (3) and (4) of the above-mentioned four parameters as an example, there can be provided a structure of selecting a filter having a higher degree of intensity with distance from a pixel used for prediction of each target pixel to be filtered according to the prediction direction in the intra prediction mode (distance from a "reference pixel" which is adjacent to the upper end of the block in the example shown in FIG. 8). Further, because the four parameters (1) to (4) are known in the moving image decoding device, carrying out the above-mentioned filtering process causes no additional information to be encoded.

The intra prediction part generates a prediction pixel for each of all the pixels of the luminance signal in the partition $P_i^n$ according to the same procedure to generate an intra prediction image $P_i^n$, and outputs the intra prediction image $P_i^n$ generated thereby. The intra prediction part outputs the intra prediction parameters used for the generation of the intra prediction image Pi to the variable length encoding part 13 in order to multiplex them into a bitstream. The intra prediction part also carries out an intra prediction process based on the intra prediction parameters (intra prediction mode) on each of the color difference signals of the partition $P_i^n$ according to the same procedure as that according to which the intra prediction part carries out the intra prediction process on the luminance signal, and outputs the intra prediction parameters used for the generation of the intra prediction image to the variable length encoding part 13. The intra prediction part can be constructed in such a way as to carry out the above-explained filtering process for the intra prediction of each of the color difference signals in the same way that the intra prediction part does for the luminance signal, or not to carry out the above-explained filtering process for the intra prediction of each of the color difference signals.

Next, the processing carried out by the moving image decoding device shown in FIG. 2 will be explained. When receiving the bitstream outputted thereto from the image encoding device of FIG. 1, the variable length decoding part 51 carries out a variable length decoding process on the bitstream to decode information having a frame size in units of a sequence which consists of one or more frames of pictures or in units of a picture (step ST21 of FIG. 4). The variable length decoding part 51 determines a maximum size of each of coding blocks which is a unit to be processed at a time when an intra prediction process (intra-frame prediction process) or a motion-compensated prediction process (inter-frame prediction process) is carried out according to the same procedure as that which the encoding controlling part 1 shown in FIG. 1 uses, and also determines an upper limit on the number of hierarchical layers in a hierarchy in which each of the coding blocks having the maximum size is hierarchically divided into blocks (step ST22). For example, when the maximum size of each of coding blocks is determined according to the resolution of the inputted image in the image encoding device, the variable length decoding part determines the maximum size of each of the coding blocks on the basis of the frame size information which the variable length decoding part has decoded previously. When information showing both the maximum size of each of the coding blocks and the upper limit on the number of hierarchical layers is multiplexed into the bitstream, the variable length decoding part refers to the information which is obtained by decoding the bitstream.

Because the information showing the state of the division of each of the coding blocks $B_0$ having the maximum size is included in the encoding mode m($B_0$) of the coding block $B_0$ having the maximum size which is multiplexed into the bitstream, the variable length decoding part 51 specifies each of the coding blocks $B^n$ into which the image is divided hierarchically by decoding the bitstream to obtain the encoding mode m($B_0$) of the coding block $B_0$ having the maximum size which is multiplexed into the bitstream (step ST23). After specifying each of the coding blocks $B^n$, the variable length decoding part 51 decodes the bitstream to obtain the encoding mode m($B^n$) of the coding block $B^n$ to specify each partition $P_i^n$ belonging to the coding block $B^n$ on the basis of the information about the partition $P_i^n$ belonging to the encoding mode m($B^n$). After specifying each partition $P_i^n$ belonging to the coding block $B^n$, the variable length decoding part 51 decodes the encoded data to obtain the compressed data, the encoding mode, the prediction error encoding parameters, and the intra prediction parameters/inter prediction parameters for each partition $P_i^n$ (step ST24).

More specifically, when the encoding mode m($B^n$) assigned to the coding block $B^n$ is an intra encoding mode, the variable length decoding part decodes the encoded data to obtain the intra prediction parameters for each partition $P_i^n$ belonging to the coding block. In contrast, when the encoding mode m($B^n$) assigned to the coding block $B^n$ is an inter encoding mode, the variable length decoding part decodes the encoded data to obtain the inter prediction parameters for each partition $P_i^n$ belonging to the coding block. The variable length decoding part further divides each partition which is a prediction unit into one or more partitions which is a transformation process unit on the basis of the transformation block size information included in the prediction error encoding parameters, and decodes the encoded data of each of the one or more partitions which is a transformation process unit to obtain the compressed data (transform coefficients on which transformation and quantization are carried out) of the partition.

When the encoding mode m($B^n$) of the partition $P_i^n$ belonging to the coding block $B^n$, which is specified by the variable length decoding part 51, is an intra encoding mode (step ST25), the selection switch 52 outputs the intra prediction parameters outputted thereto from the variable length decoding part 51 to the intra prediction part 53. In contrast, when the encoding mode m($B^n$) of the partition $P_i^n$ is an inter encoding mode (step ST25), the selection switch outputs the inter prediction parameters outputted thereto from the variable length decoding part 51 to the motion-compensated prediction part 54.

When receiving the intra prediction parameters from the selection switch 52, the intra prediction part 53 carries out an intra-frame prediction process on the partition $P_i^n$ of the coding block $B^n$ to generate an intra prediction image $P_i^n$ by using an already-decoded image signal in the frame on the basis of the intra prediction parameters (step ST26), like the intra prediction part 4 shown in FIG. 1. When generating an intra prediction image $P_i^n$, the intra prediction part 53 selects a filter from one or more filters, which are prepared in advance by using the same method as that the intra prediction part 4 shown in FIG. 1 uses, according to the states of the various parameters associated with the decoding of the target block to be filtered, and carries out a filtering process on the intra prediction image $P_i^n$ by using the filter and sets the intra prediction image $P_i^n$ on which the intra prediction part has carried out the filtering process as a final intra prediction image. Although the above explanation is made on the assumption that a necessary number of filters are prepared in advance, in the case in which a filter is defined as a function of the above-mentioned parameters in such a way that the filter is determined according to the states of the parameters used for the filter selection in the intra prediction part 4 shown in FIG. 1, a filter can be defined as a function of the above-mentioned parameters also in the intra prediction part 53 in such a way that the filter is determined according to the states of the various parameters associated with the decoding of the target block to be filtered.

When receiving the inter prediction parameters from the selection switch 52, the motion-compensated prediction part 54 carries out an motion-compensated prediction process on the partition $P_i^n$ of the coding block $B^n$ to generate an inter prediction image $P_i^n$ by using one or more frames of reference images stored in the motion-compensated prediction frame memory 59 on the basis of the inter prediction parameters (step ST27).

The inverse quantization/inverse transformation part 55 inverse-quantizes the compressed data associated with the coding block, which are outputted thereto from the variable length decoding part 51, by using the quantization parameter included in the prediction error encoding parameters outputted thereto from the variable length decoding part 51, and carries out an inverse transformation process (e.g., an inverse DCT (inverse discrete cosine transform) or an inverse transformation process such as an inverse KL transform) on the compressed data inverse-quantized thereby in units of a block having the transformation block size included in the prediction error encoding parameters, and outputs the compressed data on which the inverse quantization/inverse transformation part has carried out the inverse transformation process to the adding part 56 as a decoded prediction error signal (signal showing a pre-compressed difference image) (step ST28).

When receiving the decoded prediction error signal from the inverse quantization/inverse transformation part 55, the adding part 56 generates a decoded image by adding the decoded prediction error signal and the prediction signal showing the prediction image generated by the intra prediction part 53 or the motion-compensated prediction part 54 and stores a decoded image signal showing the decoded image in the memory 57 for intra prediction, and also outputs the decoded image signal to the loop filter part 58 (step ST29).

The moving image decoding device repeatedly carries out the processes of steps ST23 to ST29 until the moving image decoding device completes the processing on all the coding blocks $B^n$ into which the image is divided hierarchically (step ST30). When receiving the decoded image signal from the adding part 56, the loop filter part 58 compensates for an encoding distortion included in the decoded image signal, and stores the decoded image shown by the decoded image signal on which the loop filter part performs the encoding distortion compensation in the motion-compensated prediction frame memory 59 as a reference image (step ST31). The loop filter part 58 can carry out the filtering process for each coding block having the maximum size of the local decoded image signal outputted thereto from the adding part 56 or each coding block. As an alternative, after the local decoded image signal corresponding to all the macroblocks of one screen is outputted, the loop filter part can carry out the filtering process on all the macroblocks of the one screen at a time.

As can be seen from the above description, because the intra prediction part 4 of the moving image encoding device in accordance with this Embodiment 1 is constructed in such a way as to, when carrying out an intra-frame prediction process to generate an intra prediction image by using an already-encoded image signal in a frame, select a filter from one or more filters which are prepared in advance according to the states of various parameters associated with the encoding of a target block to be filtered, and carry out a filtering process on a prediction image by using the filter, there is provided an advantage of being able to reduce prediction errors which occur locally, thereby being able to improve the image quality.

Further, because the intra prediction part 4 in accordance with this Embodiment 1 is constructed in such a way as to select a filter in consideration of at least one of the following parameters: (1) the size of the partition $P_i^n$ ($l_i^n \times m_i^n$); (2) the quantization parameter included in the prediction error encoding parameters; (3) the distance between the group of already-encoded pixels which are used at the time of generating the intermediate prediction image, and the target pixel to be filtered; and (4) the index value indicating the intra prediction mode at the time of generating the intermediate prediction image, there is provided an advantage of preventing a local prediction error from occurring when a slight displacement occurs between the direction of an edge in the image to be encoded and the prediction direction or a slight distortion exists in an edge in the intermediate prediction image having a high correlation with the image to be encoded, thereby being able to improve the prediction efficiency.

Because the intra prediction part 53 of the moving image decoding device in accordance with this Embodiment 1 is constructed in such a way as to, when carrying out an intra-frame prediction process to generate an intra prediction image by using an already-decoded image signal in a frame, select a filter from one or more filters which are prepared in advance according to the states of various parameters associated with the decoding of a target block to be filtered, and carry out a filtering process on a prediction image by using the filter, there is provided an advantage of reducing prediction errors which occur locally while making it possible for the moving image decoding device to also generate the same intra prediction image as that generated by the moving image encoding device.

Further, because the intra prediction part 53 in accordance with this Embodiment 1 is constructed in such a way as to select a filter in consideration of at least one of the following parameters: (1) the size of the partition $P_i^n$ ($l_i^n \times m_i^n$); (2) the quantization parameter included in the prediction error encoding parameters; (3) the distance between the group of already-encoded pixels which are used at the time of generating the intermediate prediction image, and the target pixel to be filtered; and (4) the index value indicating the intra prediction mode at the time of generating the intermediate prediction image, there are provided an advantage of preventing a local prediction error from occurring when a slight displacement occurs between the direction of an edge in the image to be encoded and the prediction direction or a slight distortion exists in an edge in the intermediate prediction image having a high correlation with the image to be encoded, and another advantage of making it possible for the moving image decoding device to also generate the same intra prediction image as that generated by the moving image encoding device.

Embodiment 2

Although the example in which the intra prediction part 4 selects a filter according to the states of various parameters associated with the encoding of a target block to be filtered from one or more filters which are prepared in advance, and carries out a filtering process on a prediction image by using the filter when carrying out an intra-frame prediction process to generate an intra prediction image by using an already-encoded image signal in a frame is shown in above-mentioned Embodiment 1, as an alternative, a Wiener filter which minimizes the sum of squared errors between a coding block and a prediction image can be designed, and, when the use of this Wiener filter increases the degree of reduction in prediction errors as compared with the use of the filter which has been selected from the one or more filters which are prepared in advance, the filtering process can be carried out on the prediction image by using the above-mentioned Wiener filter, instead of the filter which has been selected. Hereafter, processes will be explained concretely.

Each of the intra prediction parts 4 and 53 in accordance with above-mentioned Embodiment 1 is constructed in such a way as to select a filter from one or more filters which are prepared in advance according to the states of various parameters associated with the encoding of a target block to be filtered. While each of the intra prediction parts can select an appropriate filter from the one or more selection candidates in consideration of the four parameters (1) to (4), each of the intra prediction parts cannot carry out "optimal filtering" when an optimal filter other than the one or more selection candidates exists. This Embodiment 2 is characterized in that while a moving image encoding device designs an optimal filter on a per picture basis and carries out a filtering process, and also encodes the filter coefficients of the filter, and so on, a moving image decoding device decodes the filter coefficients and so on, and carries out a filtering process by using the filter.

An intra prediction part 4 of the moving image encoding device carries out an intra-frame prediction process on each partition $P_i^n$ of each coding block $B^n$ to generate an intra prediction image $P_i^n$, like that according to above-mentioned Embodiment 1. The intra prediction part 4 also selects a filter from one or more filters which are prepared in advance according to the states of various parameters associated with the encoding of a target block to be filtered by using the same method as that the intra prediction part according to above-mentioned Embodiment 1 uses, and carries out a filtering process on the intra prediction image $P_i^n$ by using this filter. After determining intra prediction parameters for each of all coding blocks $B^n$ in the picture, for each area in which an identical filter is used within the picture (each area having the same filter index), the intra prediction part 4 designs a Wiener filter which minimizes the sum of squared errors between the inputted image in the area and the intra prediction image (mean squared error in the target area).

The filter coefficients w of the Wiener filter can be determined from an autocorrelation matrix $R_{s's'}$ of an intermediate prediction image signal s', and a cross correlation matrix $R_{ss'}$ of the inputted image signal s and the intermediate prediction image signal s' according to the following equation (4). The size of the matrices $R_{s's'}$ and $R_{ss'}$ corresponds to the number of filter taps determined.

$$w = R_{s's'}^{-1} \cdot R_{ss'} \quad (4)$$

After designing the Wiener filter, the intra prediction part 4 expresses the sum of squared errors in the target area for filter design in the case of carrying out a filtering process using the Wiener filter as D1, the code amount at the time of encoding information (e.g., filter coefficients) associated with the Wiener filter as R1, and the sum of squared errors in the target area for filter design in the case of carrying out a filtering process using a filter which is selected by using the same method as that shown in above-mentioned Embodiment 1 as D2, and then checks to see whether or not the following equation (5) is established.

$$D1 + \lambda \cdot R1 < D2 \quad (5)$$

where $\lambda$ is a constant.

When the equation (5) is established, the intra prediction part 4 carries out a filtering process by using the Wiener filter instead of a filter which is selected by using the same method as that shown in above-mentioned Embodiment 1. In contrast, when the equation (5) is not established, the intra prediction part carries out a filtering process by using a filter which the intra prediction part selects by using the same method as that shown in above-mentioned Embodiment 1. Although the intra prediction part carries out the evaluation by using the sums of squared errors D1 and D2, this embodiment is not limited to this example. The intra prediction part can alternatively carry out the evaluation by using measures showing other prediction distortion values, such as the sums of the absolute values of errors, instead of the sums of squared errors D1 and D2.

When carrying out a filtering process by using the Wiener filter, the intra prediction part 4 requires filter update information showing the filter coefficients of the Wiener filter and indexes each indicating a corresponding filter which is replaced by the Wiener filter. More specifically, when the number of filters selectable in the filtering process using filter selection parameters is expressed as L, and indexes ranging from zero to L−1 are assigned to the filters, respectively, when the designed Wiener filter is used for each index, a value of "1" needs to be encoded for the index as the filter update information, whereas when a prepared filter is used for each index, a value of "0" needs to be encoded for the index as the filter update information. A variable length encoding part 13 variable-length-encodes the filter update information outputted thereto from the intra prediction part 4, and multiplexes encoded data of the filter update information into a bitstream.

Although the example of designing a Wiener filter which minimizes the mean squared error between the inputted image and a prediction image in each area for which an identical filter is used within a picture for the area is shown in this embodiment, a Wiener filter which minimizes the mean squared error between the inputted image and a prediction image in each area for which an identical filter is used can be designed for each of other specific areas each of which is not a picture. For example, the above-mentioned design of a Wiener filter can be carried out only for a certain specific picture or only when a specific condition is satisfied (e.g., only for a picture to which a scene change detection function is added and in which a scene change is detected).

A variable length decoding part 51 of a moving image decoding device variable-length-decodes the encoded data multiplexed into the bitstream to obtain the filter update information. An intra prediction part 53 carries out an intra-frame prediction process on each partition $P_i^n$ of each coding block $B^n$ to generate a intra prediction image $P_i^n$, like that according to above-mentioned Embodiment 1. When receiving the filter update information from the variable length decoding part 51, the intra prediction part 53 refers to the filter update information to check to see whether or not there is an update to the filter indicated by the corresponding index.

When determining from the result of the check that the filter for a certain area is replaced by a Wiener filter, the intra prediction part 53 reads the filter coefficients of the Wiener filter which are included in the filter update information to specify the Wiener filter, and carries out a filtering process on the intra prediction image $P_i^n$ by using the Wiener filter. In contrast, for an area in which no filter is replaced by a Wiener filter, the intra prediction part selects a filter by using the same method as that which the intra prediction part according to above-mentioned Embodiment 1 uses, and carries out a filtering process on the intra prediction image $P_i^n$ by using the filter.

As can be seen from the above description, because the moving image encoding device in accordance with this Embodiment 2 is constructed in such a way as to design a Wiener filter which minimizes the sum of squared errors between a coding block and a prediction image, and, when the use of this Wiener filter increases the degree of reduction in prediction errors as compared with the use of a filter which is selected from one or more filters which are prepared in advance, carry out a filtering process on the prediction image by using the Wiener filter, instead of the selected filter, there is provided an advantage of being able to further reduce prediction errors which occur locally as compared with above-mentioned Embodiment 1.

While the invention has been described in its preferred embodiments, it is to be understood that an arbitrary combination of two or more of the above-mentioned embodiments can be made, various changes can be made in an arbitrary component according to any one of the above-mentioned embodiments, and an arbitrary component according to any one of the above-mentioned embodiments can be omitted within the scope of the invention.

INDUSTRIAL APPLICABILITY

As mentioned above, because the moving image encoding device, the moving image decoding device, the moving image encoding method, and the moving image decoding method in accordance with the present invention are configured in such a way as to, when an intra prediction unit carries out an intra-frame prediction process to generate a prediction image by using an already-encoded image signal in a frame, select a filter from one or more filters which are prepared in advance according to the state of various parameters associated with the encoding of a target block to be filtered, and carry out a filtering process on a prediction image by using the filter, and output the prediction image on which the filtering process has been carried out to a difference image generating unit, the moving image encoding device and the moving image encoding method are suitable for use as a moving image encoding device for and a moving image encoding method of encoding a moving image with a high degree of efficiency, and the moving image decoding device and the moving image decoding method are suitable for use as a moving image decoding device for and a moving image decoding method of decoding an encoded moving image with a high degree of efficiency.

EXPLANATIONS OF REFERENCE NUMERALS

1 encoding controlling part (encoding controlling unit), 2 block dividing part (block dividing unit), 3 selection switch (intra prediction unit and motion-compensated prediction unit), 4 intra prediction part (intra prediction unit), 5 motion-compensated prediction part (motion-compensated prediction unit), 6 subtracting part (difference image generating unit), 7 transformation/quantization part (image compression unit), 8 inverse quantization/inverse transformation part, 9 adding part, 10 memory for intra prediction, 11 loop filtering part, 12 motion-compensated prediction frame memory, 13 Variable length encoding unit (variable length encoding unit), 31 variable length decoding part (variable length decoding unit), 52 selection switch (intra prediction unit and motion-compensated prediction unit), 53 intra prediction part (intra prediction unit), 54 motion-compensated prediction part (motion-compensated prediction unit), 55 inverse quantization/inverse transformation part (difference image generating unit), 56 adding part (decoded image generating unit), 57 memory for intra prediction, 58 loop filtering part, 59 motion-compensated prediction frame memory.

The invention claimed is:

1. An image decoding device comprising:
an intra prediction unit for carrying out an intra-frame prediction process on a block which is a unit for a prediction process to generate an intermediate prediction image, said intermediate prediction image being generated by obtaining a prediction value for each pixel based on reference pixels according to an intra prediction mode, the intra prediction mode being an average prediction mode,
wherein said intra prediction unit provides an image which is obtained by performing a filtering process on the intermediate prediction image as a final prediction image only for specific pixels in the block, the specific pixels being determined depending on a distance between the reference pixels and pixels in the block, and provides the intermediate prediction image as a final prediction image for other pixels in the block, the filtering process being performed according to a condition of a plurality of parameters including a block size of said block, a type of color component, and an index value indicating the intra prediction mode at the time of generating the intermediate prediction image.

2. An image decoding method comprising:
carrying out an intra-frame prediction process on a block which is a unit for a prediction process to generate an intermediate prediction image, said intermediate prediction image being generated by obtaining a prediction value for each pixel based on reference pixels according to an intra prediction mode, the intra prediction mode being an average prediction mode, and
providing an image which is obtained by performing a filtering process on the intermediate prediction image as a final prediction image only for specific pixels in the block, the specific pixels being determined depending on a distance between the reference pixels and pixels in the block, and providing the intermediate prediction image as a final prediction image for other pixels in the block, the filtering process being performed according to a condition of a plurality of parameters including a block size of said block, a type of color component, and an index value indicating the intra prediction mode at the time of generating the intermediate prediction image.

3. An image encoding device comprising:
an intra prediction unit for carrying out an intra-frame prediction process on a block which is a unit for a prediction process to generate an intermediate prediction image, said intermediate prediction image being generated by obtaining a prediction value for each pixel based on reference pixels according to an intra prediction mode, the intra prediction mode being an average prediction mode,
wherein said intra prediction unit provides an image which is obtained by performing a filtering process on the intermediate prediction image as a final prediction image only for specific pixels in the block, the specific pixels being determined depending on a distance between the reference pixels and pixels in the block, and provides the intermediate prediction image as a final prediction image for other pixels in the block, the filtering process being performed according to a condition of a plurality of parameters including a block size of said block, a type of color component, and an index value indicating the intra prediction mode at the time of generating the intermediate prediction image.

4. An image encoding method comprising:
carrying out an intra-frame prediction process on a block which is a unit for a prediction process to generate an intermediate prediction image, said intermediate prediction image being generated by obtaining a prediction value for each pixel based on reference pixels according to an intra prediction mode, the intra prediction mode being an average prediction mode, and
providing an image which is obtained by performing a filtering process on the intermediate prediction image as a final prediction image only for specific pixels in the block, the specific pixels being determined depending on a distance between the reference pixels and pixels in the block, and providing the intermediate prediction image as a final prediction image for other pixels in the block, the filtering process being performed according to a condition of a plurality of parameters including a block size of said block, a type of color component, and an index value indicating the intra prediction mode at the time of generating the intermediate prediction image.

5. An image decoding device comprising:
an intra prediction unit for carrying out an intra-frame prediction process on a block which is a unit for a prediction process to generate an intermediate prediction image, said intermediate prediction image being generated by obtaining a prediction value for each pixel based on reference pixels according to an intra prediction mode, the intra prediction mode being an average prediction mode,
wherein said intra prediction unit provides an image which is obtained by performing a filtering process on the intermediate prediction image as a final prediction image only for specific pixels in the block, the specific pixels being determined depending on a distance between the reference pixels and pixels in the block, and provides the intermediate prediction image as a final prediction image for other pixels in the block, the filtering process being performed according to a condition of a plurality of parameters including the intra prediction mode, a type of color component, and an index value indicating the intra prediction mode at the time of generating the intermediate prediction image.

6. An image decoding method comprising:
carrying out an intra-frame prediction process on a block which is a unit for a prediction process to generate an intermediate prediction image, said intermediate prediction image being generated by obtaining a prediction value for each pixel based on reference pixels according to an intra prediction mode, the intra prediction mode being an average prediction mode, and
providing an image which is obtained by performing a filtering process on the intermediate prediction image as a final prediction image only for specific pixels in the block, the specific pixels being determined depending on a distance between the reference pixels and pixels in the block, and providing the intermediate prediction image as a final prediction image for other pixels in the block, the filtering process being performed according to a condition of a plurality of parameters including the intra prediction mode, a type of color component, and an index value indicating the intra prediction mode at the time of generating the intermediate prediction image.

7. An image encoding device comprising:
an intra prediction unit for carrying out an intra-frame prediction process on a block which is a unit for a prediction process to generate an intermediate prediction image, said intermediate prediction image being generated by obtaining a prediction value for each pixel based on reference pixels according to an intra prediction mode, the intra prediction mode being an average prediction mode,
wherein said intra prediction unit provides an image which is obtained by performing a filtering process on the intermediate prediction image as a final prediction image only for specific pixels in the block, the specific pixels being determined depending on a distance between the reference pixels and pixels in the block, and provides the intermediate prediction image as a final prediction image for other pixels in the block, the filtering process being performed according to a condition of a plurality of parameters including the intra prediction mode, a type of color component, and an index value indicating the intra prediction mode at the time of generating the intermediate prediction image.

8. An image encoding method comprising:
carrying out an intra-frame prediction process on a block which is a unit for a prediction process to generate an intermediate prediction image, said intermediate prediction image being generated by obtaining a prediction value for each pixel based on reference pixels according to an intra prediction mode, the intra prediction mode being an average prediction mode, and
providing an image which is obtained by performing a filtering process on the intermediate prediction image as a final prediction image only for specific pixels in the block, the specific pixels being determined depending on a distance between the reference pixels and pixels in the block, and providing the intermediate prediction image as a final prediction image for other pixels in the block, the filtering process being performed according to a condition of a plurality of parameters including the intra prediction mode, a type of color component, and an index value indicating the intra prediction mode at the time of generating the intermediate prediction image.

9. A non-transitory computer-readable medium storing a bitstream generated by performing a block based prediction process on an image, said bitstream comprising:

a coded data of intra prediction mode used to generate an intermediate prediction image by obtaining a prediction value for each pixel based on reference pixels according to an intra prediction mode, the intra prediction mode being an average prediction mode; and a compressed difference image obtained by performing a data compression process on a difference image between a final prediction image and said image;

wherein an image which is obtained by performing a filtering process on the intermediate prediction image is provided as a final prediction image only for specific pixels in the block, the specific pixels being determined depending on a distance between the reference pixels and pixels in the block, and the intermediate prediction image is provided as a final prediction image for other pixels in the block, the filtering process being performed according to a condition of a plurality of parameters including a block size of said block, a type of color component, and an index value indicating the intra prediction mode at the time of generating the intermediate prediction image.

10. A non-transitory computer-readable medium storing a bitstream generated by performing a block based prediction process on an image, said bitstream comprising:

a coded data of intra prediction mode used to generate an intermediate prediction image by obtaining a prediction value for each pixel based on reference pixels according to an intra prediction mode, the intra prediction mode being an average prediction mode; and a compressed difference image obtained by performing a data compression process on a difference image between a final prediction image and said image;

wherein an image which is obtained by performing a filtering process on the intermediate prediction image is provided as a final prediction image only for specific pixels in the block, the specific pixels being determined depending on a distance between the reference pixels and pixels in the block, and the intermediate prediction image is provided as a final prediction image for other pixels in the block, the filtering process being performed according to a condition of a plurality of parameters including the intra prediction mode, a type of color component, and an index value indicating the intra prediction mode at the time of generating the intermediate prediction image.

* * * * *